(12) United States Patent
Tago et al.

(10) Patent No.: US 7,134,004 B1
(45) Date of Patent: Nov. 7, 2006

(54) PROCESSING DEVICE FOR BUFFERING SEQUENTIAL AND TARGET SEQUENCES AND TARGET ADDRESS INFORMATION FOR MULTIPLE BRANCH INSTRUCTIONS

(75) Inventors: Shin-ichiro Tago, Kawasaki (JP); Taizo Sato, Kawasaki (JP); Yoshimasa Takebe, Kawasaki (JP); Yasuhiro Yamazaki, Kawasaki (JP); Teruhiko Kamigata, Kawasaki (JP); Atsuhiro Suga, Kawasaki (JP); Hiroshi Okano, Kawasaki (JP); Hitoshi Yoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 747 days.

(21) Appl. No.: 09/666,853

(22) Filed: Sep. 20, 2000

(30) Foreign Application Priority Data

Sep. 29, 1999 (JP) .................................. 11-276625
Nov. 30, 1999 (JP) .................................. 11-341014

(51) Int. Cl.
*G06F 9/00* (2006.01)
(52) U.S. Cl. .................................................. 712/235
(58) Field of Classification Search ................ 712/205, 712/206, 207, 233–239
See application file for complete search history.

(56) References Cited

U.S. PATENT DOCUMENTS

| | | | | |
|---|---|---|---|---|
| 4,532,589 A | * | 7/1985 | Shintani et al. | 712/217 |
| 5,423,048 A | * | 6/1995 | Jager | 712/207 |
| 5,737,590 A | | 4/1998 | Hara | |
| 5,740,415 A | * | 4/1998 | Hara | 712/238 |
| 5,835,754 A | * | 11/1998 | Nakanishi | 712/239 |
| 5,864,697 A | * | 1/1999 | Shiell | 712/240 |
| 5,964,870 A | | 10/1999 | Malizewski | |
| 6,289,442 B1 | * | 9/2001 | Asato | 712/239 |

FOREIGN PATENT DOCUMENTS

JP      6-324864      11/1994

OTHER PUBLICATIONS

Lee et al., "Instruction Cache Fetch Policies for Speculative Execution," 1995, pp. 357-367.*
European Search Report dated May 24, 2005.

* cited by examiner

*Primary Examiner*—Eddie Chan
*Assistant Examiner*—David J. Huisman
(74) *Attorney, Agent, or Firm*—Katten Muchin Rosenman LLP

(57) ABSTRACT

An information processing device reads, buffers, decodes and executes instructions from an instruction store portion by pipeline processing includes: an instruction reading request portion which assigns a read address to the instruction store portion, an instruction buffering portion which includes a plurality of instruction buffers which buffer an instruction sequence read from the instruction store portion; an instruction execution unit which decodes and executes instructions buffered by the instruction buffering portion. A branching instruction detection portion detects a branching instruction in the instruction sequence read from the instruction store portion. A branch target address information buffering portion includes a plurality of branch target address information buffers which, when the branching instruction detection portion has detected a branching instruction, buffer the branch target address information for generating the branch target address of the branching instruction.

9 Claims, 18 Drawing Sheets

FIG. 3

| Instruction Address | Instruction |
|---|---|
| 01 | Condition Determination Instruction |
| 02 | Condition Branching Instruction (branch to address 11) |
| 03 | Condition Determination Instruction |
| 04 | Condition Branching Instruction (branch to address 41) |
| 05 | Arithmetic Instruction |
| 06 | ″ |
| 07 | ″ |
| 08 | ″ |
| 11 | Condition Determination Instruction |
| 12 | Condition Branching Instruction (branch to address 21) |
| 13 | Condition Determination Instruction |
| 14 | Condition Branching Instruction (branch to address 51) |
| 15 | Arithmetic Instruction |
| 16 | ″ |
| 21 | Condition Determination Instruction |
| 22 | Condition Branching Instruction (branch to address 31) |
| 23 | Condition Determination Instruction |
| 24 | Condition Branching Instruction |
| 25 | Arithmetic Instruction |
| 26 | ″ |
| 27 | ″ |
| 28 | ″ |
| 31 | Condition Determination Instruction |
| 32 | Condition Branching Instruction |
| 33 | Condition Determination Instruction |
| 34 | Condition Branching Instruction |
| 41 | Condition Determination Instruction |
| 42 | Condition Branching Instruction (branch to address 61) |
| 43 | Arithmetic Instruction |
| 44 | ″ |
| 45 | ″ |
| 46 | ″ |
| 51 | Arithmetic Instruction |
| 52 | ″ |
| 53 | ″ |
| 54 | ″ |
| 55 | ″ |
| 61 | Arithmetic Instruction |
| 62 | ″ |
| 63 | ″ |
| 64 | ″ |
| 65 | ″ |
| 66 | ″ |

At Cycle 3 for Branching Route (1)

At Cycle 9 for Route (1)

FIG. 12

Branching Route (4)

| Instruction Address | Instruction | Cycle 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 01 | INST | P | T | C | D | E | W | | | | | | | | | |
| 02 | B-INST (not jump to 11) | P | T | C | (C) | D | E | W | | | | | | | | |
| 03 | INST | | P | T | C | (C) | (C) | D | E | W | | | | | | |
| 04 | B-INST (not jump to 41) | | P | T | C | (C) | (C) | (C) | (C) | D | E | W | | | | |
| 05 | INST | | | P | C | C | (C) | (C) | (C) | (C) | (C) | D | (C) | | | |
| 06 | " | | | P | T | C | T | C | (C) | (C) | (C) | (C) | (C) | | | |
| 07 | " | | | | T | P | | | | | | | | | | |
| 08 | " | | | | | P | | | | | | | | | | |
| 11 | INST | | | | | T | C | W | E | D | E | W | E | D | | |
| 12 | B-INST | | | | | T | C | D | (C) | D | | | | | | |
| 13 | INST | | | | | | P | P | | | | | | | | |
| 14 | INST | | | | | | P | P | | | | | | | | |
| 15 | " | | | | | | | | | | | | | | | |
| 16 | " | | | | | | | | | | | | | | | |
| 41 | INST | | | | | | | | T | | | | | | | |
| 42 | B-INST | | | | | | | | T | | | | | | | |
| 43 | INST | | | | | | | | P | | | | | | | |
| 44 | " | | | | | | | | P | | | | | | | |
| 45 | " | | | | | | | | | | | | | | | |
| 46 | " | | | | | | | | | | | | | | | |

Penalty 1 (cycles 7–8, 9–10); Invalidated

FIG. 16

First Control Example

| | Branching direction not determined | | | | | | |
|---|---|---|---|---|---|---|---|
| | Cache Hit | | Memory Bus Access | | | | |
| Predicted Branching Direction | Sequential Side | Target Side | Sequential Side | | Target Side | | Memory Bus Access after determined |
| | | | Bus Access | Fetch | Bus Access | Fetch | S Sequential / T Target |
| Sequential Side | Miss | Miss | Yes | Yes | No | T | No / Yes |
| | Miss | Hit | Yes | Yes | No | Yes | No / No |
| | Hit | Miss | No | Yes | No | T | No / Yes |
| | Hit | Hit | No | Yes | No | Yes | No / No |
| Target Side | Miss | Miss | No | T | Yes | Yes | Yes / No |
| | Miss | Hit | No | T | No | Yes | Yes / No |
| | Hit | Miss | No | Yes | Yes | Yes | No / No |
| | Hit | Hit | No | Yes | No | Yes | No / No |

FIG. 17

Second Control Example

| | Branching direction not determined | | | | | | |
|---|---|---|---|---|---|---|---|
| | Cache Hit | | Memory Bus Access | | | | |
| Predicted Branching Direction | Sequential Side | Target Side | Sequential Side | | Target Side | | Memory Bus Access after determined |
| | | | Bus Access | Fetch | Bus Access | Fetch | S Sequential / T Target |
| Sequential Side | Miss | Miss | Yes | Yes | No | T | No / Yes |
| | Miss | Hit | Yes | Yes | No | Yes | No / No |
| | Hit | Miss | No | Yes | No | T | No / Yes |
| | Hit | Hit | No | Yes | No | Yes | No / No |
| Target Side | Miss | Miss | Yes | Yes | Yes | Yes | No / No |
| | Miss | Hit | Yes | Yes | No | Yes | No / No |
| | Hit | Miss | No | Yes | Yes | Yes | No / No |
| | Hit | Hit | No | Yes | No | Yes | No / No |

FIG. 18

Third Control Example

| | Branching direction not determined | | | | | | | |
|---|---|---|---|---|---|---|---|---|
| | Cache Hit | | Memory Bus Access | | | | Memory Bus Access after determined | |
| Predicted Branching Direction | Sequential Side | Target Side | Sequential Side | | Target Side | | S Sequential | T Target |
| | | | Bus Access | Fetch | Bus Access | Fetch | | |
| Sequential Side | Miss | Miss | No | T | No | T | Yes | Yes |
| | Miss | Hit | No | T | No | Yes | Yes | No |
| | Hit | Miss | No | Yes | No | T | No | Yes |
| | Hit | Hit | No | Yes | No | Yes | No | No |
| Target Side | Miss | Miss | No | T | No | T | Yes | Yes |
| | Miss | Hit | No | T | No | Yes | Yes | No |
| | Hit | Miss | No | Yes | No | T | No | Yes |
| | Hit | Hit | No | Yes | No | Yes | No | No |

FIG. 19

Fourth Control Example

| | Branching direction not determined | | | | | | | |
|---|---|---|---|---|---|---|---|---|
| | Cache Hit | | Memory Bus Access | | | | Memory Bus Access after determined | |
| Predicted Branching Direction | Sequential Side | Target Side | Sequential Side | | Target Side | | S Sequential | T Target |
| | | | Bus Access | Fetch | Bus Access | Fetch | | |
| Sequential Side | Miss | Miss | Yes | Yes | Yes | Yes | No | No |
| | Miss | Hit | Yes | Yes | No | Yes | No | No |
| | Hit | Miss | No | Yes | Yes | Yes | No | No |
| | Hit | Hit | No | Yes | No | Yes | No | No |
| Target Side | Miss | Miss | No | T | Yes | Yes | Yes | No |
| | Miss | Hit | No | T | No | Yes | Yes | No |
| | Hit | Miss | No | Yes | Yes | Yes | No | No |
| | Hit | Hit | No | Yes | No | Yes | No | No |

FIG. 20

Embodiment

| Cycle | 1 | 2 | 3 | 4 | 5 | 6 | 7 | 8 | 9 | 10 | 11 | 12 | 13 | 14 | · | 30 | 31 | 32 | 33 | 34 | 35 | 36 |
|---|---|---|---|---|---|---|---|---|---|---|---|---|---|---|---|---|---|---|---|---|---|---|
| INST 01 | P | T | C | D | E | E | E | W | | | | | | | | | | | | | | |
| 02 | | P | T | C | D | D | E | E | W | | | | | | | | | | | | | |
| 03 | | | P | T | C | C | D | C | D | W | | | | | | | | | | | | |
| 04 | | | | P | T | C | C | C | C | D | W | | | | | | | | | | | |
| 05 | | | | | P | T | C | C | C | C | D | W | | | | | | | | | | |
| 06 | | | | | | P | T | C | C | C | C | D | W | W | | | | | | | | |
| 07 | | | | | | | P | T | C | C | C | C | D | E | W | | | | | | | |
| 08 | | | | | | | | P | T | M | B | R | · | · | · | C | D | E | W | | | |
| 09 | | | | | | | | | P | T | M | B | B | B | · | · | C | D | E | W | | |
| 10 | | | | | | | | | | P | T | M | B | B | · | · | · | C | D | E | W | |
| 11 | | | | | | | | | | | | | | | | | P | T | C | D | E | W |
| 12 | | | | | | | | | | | | | | | | | | P | T | C | D | E |
| 51 | | | | | | P | T | M | | | | | | | | | | | | | | |
| 52 | | | | | | | P | T | M | | | | | | | | | | | | | |
| 53 | | | | | | | | P | T | M | | | | | | | | | | | | |

INST 01→INST 02→INST 03→INST 04→INST 05→INST 06→INST 07→INST 08→INST 09→
└→INST 51→INST 52→INST 53→INST 54→

(INST 03 is branching instruction, is predected not to branch, and does not branch is fact)

FIG. 21

Prior Art

| Cycle | 1 | 2 | 3 | 4 | 5 | 6 | 7 | 8 | 9 | 10 | 11 | 12 | 13 | 14 | · | 28 | 29 | 30 | · | 46 | 47 | 48 |
|---|---|---|---|---|---|---|---|---|---|---|---|---|---|---|---|---|---|---|---|---|---|---|
| INST 01 | P | T | C | D | E | E | E | W | | | | | | | | | | | | | | |
| 02 | | P | T | C | D | D | E | E | W | | | | | | | | | | | | | |
| 03 | | | P | T | C | C | D | C | D | W | | | | | | | | | | | | |
| 04 | | | | P | T | C | C | C | C | D | W | | | | | | | | | | | |
| 05 | | | | | P | T | C | C | C | C | D | W | | | | | | | | | | |
| 06 | | | | | | P | T | C | C | C | C | D | W | | | | | | | | | |
| 07 | | | | | | | P | T | C | C | C | C | D | W | | | | | | | | |
| 08 | | | | | | | | P | T | M | B | B | B | B | · | R | · | · | · | C | D | E |
| 09 | | | | | | | | | P | T | M | B | B | B | · | | | | | | C | D |
| 10 | | | | | | | | | | P | T | M | B | B | · | | | | | | | P |
| 11 | | | | | | | | | | | | | | | | | | | | | | T |
| 12 | | | | | | | | | | | | | | | | | | | | | | P |
| 51 | | | | | | P | T | M | B | R | · | · | · | · | · | C | | | | | | |
| 52 | | | | | | | P | T | M | B | B | B | B | B | · | · | C | | | | | |
| 53 | | | | | | | | P | T | M | B | B | B | B | · | · | · | C | | | | |

INST 01→INST 02→INST 03→INST 04→INST 05→INST 06→INST 07→INST 08→INST 09→
└→INST 51→INST 52→INST 53→INST 54→

(INST 03 is branching instruction, is predected not to branch, and does not branch is fact)

PROCESSING DEVICE FOR BUFFERING SEQUENTIAL AND TARGET SEQUENCES AND TARGET ADDRESS INFORMATION FOR MULTIPLE BRANCH INSTRUCTIONS

BACKGROUND OF THE INVENTION

1. Field of the Invention

The present invention relates to an information processing device which reads instructions, buffers and executes instructions by pipeline processing, and more, particularly, to an information processing device which can reduce pipeline branching confusion when executing instruction sequences comprising branching instructions.

The present invention further relates to a memory bus access system for an information processing device which performs instruction fetching, instruction buffering and instruction decoding and execution by pipeline processing, and more particularly provides an efficient memory bus access system in a dual instruction fetch-type information processing system which performs parallel fetches for branching-generating side instruction sequence (referred to below as target side instruction sequence) and non-branching-generating side sequence (referred to below as sequential side instruction sequence).

2. Description of the Related Art

In information processing devices such as microprocessors which have employed pipeline processing, the reading of consecutive instruction sequences is performed successively without waiting for the execution of the individual instructions to be completed and the aforementioned instructions are buffered in an instruction buffer in such a way that there are no empty spaces in the execution cycle of the execution unit. However, when there is a branching instruction in the instruction sequence, the branch target instruction which has the possibility of being executed directly after this branching instruction becomes an instruction which does not follow in address from that branching instruction and the pipeline processing becomes confused, possibly reducing the efficiency of the information processing device.

For this reason, a method has been devised in which, if the information processing device has read a branching instruction, the branch target instruction sequence of that branching instruction is read in advance and buffered in an instruction buffer so that the confusion of the pipeline processing is minimized.

FIG. 13 shows a general constructional diagram of a conventional information processing device which performs such pipeline processing. A conventional information processing device has an instruction store 11 which stores the instruction sequence which is to be executed, an instruction buffering portion 12 which buffers the instruction read from the instruction store 11 and supplies to the decoder 21 the instruction whose execution is predicted, an instruction execution unit 20 provided with a decoder 21 which decodes the instruction supplied from the instruction buffering portion 12 and, if that instruction is a branching instruction, supplies a branch target address information (usual corresponding address) to a branch target address generating portion 16, a branch target address generating portion 16 which generates branch target addresses on the basis of the branch target address information which is received from the decoder 21 and a current address counter value, and an instruction reading request portion 17 which selects the instruction address to be read next from among the program counter values or branch target addresses received from the branch target address generating portion 16, or the addresses which have been requested from the instruction execution unit 20, supplies this address to the instruction store 11 and executes the instruction reading request.

In this type of information processing device, the decoder 21 decodes instructions which are supplied from the instruction buffering portion 12 and, if it detects that this instruction is a branching instruction, before the execution of this branching instruction, generated is the address of the branch target instruction which is a candidate to be the next instruction executed after this branching instruction, and this branch target instruction and the following instruction sequence can be read from the instruction store 11 in advance and buffered in the instruction buffering portion 12.

Therefore, when the branching to a branch target instruction has been determined as a result of the execution of a destination instruction, or when branching to a branch target instruction has been predicted, it is possible to process a branching instruction sequence at high speed with a low level of pipeline processing confusion by fetching this branch target instruction sequence from the instruction buffering portion 12 to the instruction execution unit 20.

In such a case, if instruction buffers for a plurality of sequences are provided in the instruction buffering portion 12, the branch target instruction sequence which is predicted to branch can be respectively buffered in the instruction buffers for a plurality of sequences and when it has been decided to perform branching the branch target instruction can be quickly fetched from the instruction buffer so that even when branching instructions consecutively follow, pipeline confusion can be reduced.

However, the constitution according to the prior art provides multi-sequence instruction buffers so that all the branch target instruction sequences which are predicted to branch can be buffered when there is a large number of branching instructions. This results in a disadvantageous increase in the hardware (instruction buffer) of the information processing device.

In addition, because in the information processing device according to the prior art it was necessary to decode branching instructions so as to generate branch target addresses in order to read branch target instruction sequences of the branching instructions, a large amount of processing time was required after reading the branching instruction until the branch target instruction corresponding to the aforementioned branching instruction was read, so that an instruction buffer for a plurality of instruction sequences could not be employed effectively.

The microprocessor (or information processing device) which relates to a second aspect of the invention and which performs instruction fetching, instruction buffering, instruction decoding and instruction execution by pipeline processing, performs high speed processing because it performs consecutive instruction sequence instruction fetching in advance, without any gaps in the execution stages in the execution unit. However, if there are branching instructions present inside the instruction sequence, which instruction sequence is fetched next varies depending on whether the system waits for the execution of that branching instruction and branches on the target side instruction sequence or whether it continues on the sequential side instruction sequence. As a result of this, empty spaces are generated temporally in the execution cycle of the execution unit. A target side instruction sequence is a branch target instruction sequence which is executed when branching is carried out as a result of a branching instruction being executed, and a sequential side instruction sequence is an instruction sequence which is executed when branching is not carried out as a result of a branching instruction being executed.

In order to avoid the abovementioned situations, dual instruction fetch-type information processing devices have been proposed, in which the CPU simultaneously outputs instruction fetch requests for both target side instruction sequence and sequential side instruction sequence and stores these instructions respectively in the 2 instruction buffers inside the CPUs. In these dual instruction fetch type devices, irrespective of whether the execution of the branching instruction results in branching to the target side or not, the next instruction sequence to be executed is buffered in the instruction buffer so that it is possible to minimize the execution stage delay associated with a new instruction fetch resulting from a predicted miss for the branching direction of the branching instruction.

In addition, a CPU which is a microprocessor uses a cache memory in order to perform high speed instruction fetching. Without using an external memory bus, CPU can not fetch instructions and data from a main memory of an external component in which instructions and data and the like are stored. Because the abovementioned memory bus access operations take a comparatively long time (a large number of pipeline cycles), a cache memory which stores instructions and data in the main memory is provided to the CPU. Usually, in the instruction fetch operation from the CPU, requests are made to the cache memory and fetched instructions are stored in the instruction buffer. When the cache memory does not store the fetched instruction with resulting a cache miss, a fetch object instruction is fetched from the main memory via the memory bus and is stored in both the instruction buffer and the cache memory.

However, when a main memory bus access which makes an instruction fetch from the main memory is performed frequently, the traffic on the memory bus increases. An increase in traffic on the memory busses causes delays in accessing the memory bus. In particular, it is undesirable that, in a stage before the branching instruction is executed, it takes a long time to fetch from the main memory instructions which have become necessary as a result of the execution of the branching instruction, due to the fact that target side or sequential side instructions which will probably not be executed are extracted from the main memory.

SUMMARY OF THE INVENTION

Therefore, the object of the present invention is to restrict the increase in the hardware for instruction buffers and the like and reduce the confusion in the pipeline processing due to consecutive branching instructions in an information processing device which reads an instruction before the aforementioned instruction is executed by pipeline processing.

A further object of the present invention is to provide a memory bus access system for an information processing device which reduces the number of superfluous memory bus accesses and makes more efficient instruction fetches possible.

In order to achieve the above objects, a first aspect of the present invention is defined in that an information processing device which reads, buffers, decodes and executes instructions from an instruction store portion by pipeline processing comprises: an instruction reading request portion which assigns a read address to the instruction store portion; an instruction buffering portion including a plurality of instruction buffers which buffer an instruction sequence read from the instruction store portion; an instruction execution unit which decodes and executes instructions buffered by the instruction buffering portion; a branching instruction detection portion which detects a branching instruction in the instruction sequence read from the instruction store portion; and a branch target address information buffering portion including a plurality of branch target address information buffers which, when the branching instruction detection portion has detected a branching instruction, buffer the branch target address information for generating the branch target address of the branching instruction; wherein, when the branching instruction detection portion has detected a branching instruction, either the branch target address information of the branching instruction is stored in one of the plurality of branch target address information buffers, or the branch target instruction sequence of the branching instruction is stored in one of the plurality of instruction buffers in addition to the storing in the branch target address information buffer.

In order to achieve the above objects, a second aspect of the present invention is defined in that an information processing device which reads, buffers, decodes and executes instructions from an instruction store portion by pipeline processing comprises: an instruction reading request portion which assigns a read address to the instruction store portion; an instruction buffering portion including a plurality of instruction buffers which buffer an instruction sequence read from the instruction store portion; an instruction execution unit which decodes and executes instructions buffered by the instruction buffering portion; a branching instruction detection portion which detects a branching instruction in the instruction sequence read from the instruction store portion; and a branch target address information buffering portion including a plurality of branch target address information buffers which, when the branching instruction detection portion has detected a branching instruction, buffer the branch target address information for generating the branch target address of the branching instruction; wherein, the first instruction sequence being processed is stored in either one of the first or second instruction buffer and when the branching instruction detection portion detects the branching instruction in the first instruction sequence, a second instruction sequence of the branch target is stored in the other one of the first or second instruction buffers in accordance with the branch target address information of the branching instruction, the branch target address information of the next branching instruction in the first instruction sequence is stored in either one of the first or second branch target address information buffer, and the branch target address information of the branching instruction in the second instruction sequence is stored in the other one of the first or second branch target address information buffer.

Because this invention has a branching instruction detection portion which detects branching instructions in an instruction sequence which has been read from instruction store portion, a branching instruction in an instruction sequence which has been read can be detected before the decoding of the instruction buffered inside the first or second instruction buffer.

In addition, when the branching instruction is in the first instruction sequence, since it is necessary to employ at least the first and second instruction buffers which store the first instruction sequence that is being processed and the second instruction sequence of the branch target, the hardware for instruction buffering portions which store the branch target instruction sequence can be reduced.

In addition, the branch target address information of the next branching instruction inside the first instruction sequence being processed and the branch target address information of the next branching instruction inside the second instruction are stored in the first and the second branch target address information buffer. For this reason, by processing the branching instruction, irrespective of whether the system is in the branching state or in the non-branching state, it is possible to read the branch target instruction sequence immediately by this stored branch target address information, and the confusion in the pipeline processing due to consecutive branching instructions can be reduced.

In order to achieve the above objects, a third aspect of the present invention is defined in that an information processing device comprises: an instruction fetch portion which fetches both a sequential side instruction sequence and a target side instruction sequence of a branching instruction; a cache controller which fetches instructions from a cache memory or from a main memory in response to a fetch request from the instruction fetch portion; a memory bus access portion which accesses the main memory; an instruction buffer which buffers instructions which have been fetched; and a branching prediction portion which, prior to an execution of a branching instruction, performs a branching prediction for the branching instruction stored in the instruction buffer; wherein if the branching direction of the branching instruction is not yet determined, the cache controller performs a memory bus access to the main memory according to a branching direction predicted by the branching prediction portion.

In the aforementioned invention, in the preferred first embodiment, while the branching direction of the branching instruction is not determined, if the cache controller has performed a cache miss with respect to an instruction in the predicted branching direction of the branching instruction, the cache controller performs the memory bus access to the main memory for an instruction fetch, and if the cache controller has performed a cache miss with respect to an instruction which is not in the predicted branching direction, the cache controller does not perform the memory bus access and stops the instruction fetch.

That is, in the first case, if the predicted branching direction of the branching instruction is the target side and a cache miss has been made with respect to an instruction on the sequential side, the memory bus access is not performed and the instruction fetch is stopped, while in the second case, if the predicted branching direction of the branching instruction is the sequential side and a cache miss has been made with respect to an instruction on the target side, the memory bus access is not performed and the instruction fetch is stopped. In cases other than these, the cache controller performs the memory bus access and performs the instruction fetch.

In the present invention, in the second preferred embodiment, while the branching direction of the branching instruction is not determined, if the cache controller has performed a cache miss with respect to an instruction on the target side when the predicted branching direction of the branching instruction is the sequential side, the cache controller does not perform a memory bus access and stops the instruction fetch. In cases other than these, the cache controller performs the memory bus access and performs the instruction fetch. Therefore, in contrast to the first embodiment, in the second embodiment if the predicted branching direction is the target side and a cache miss is made with respect to an instruction on the sequential side, an instruction fetch is performed by a memory bus access. This is because the probability of an instruction fetch on the sequential side making a cache miss is low, and in the infrequent case, it is rarely necessary to stop a memory bus access.

In order to achieve the above objects, a fourth aspect of the present invention is defined in that an information processing device comprises: an instruction fetch portion which fetches both a sequential side instruction sequence and a target side instruction sequence of a branching instruction; a cache controller which fetches instructions from a cache memory or from a main memory in response to a fetch request from the instruction fetch portion; a memory bus access portion which accesses the main memory; and an instruction buffer which buffers instructions which have been fetched; and a branching prediction portion which, prior to an execution of a branching instruction, performs a branching prediction for the branching instruction which is stored in the instruction buffer; wherein, if the branching direction of said branching instruction is not yet determined and said cache controller performs a cache miss with respect to an instruction fetch, said cache controller does not perform a memory bus access and stops the instruction fetch, and if said branching instruction has been determined and said cache controller performs a cache miss with respect to an instruction in the determined branching direction, said cache controller performs a memory bus access.

In the aforementioned invention, a memory bus access after a cache miss is performed only with respect to an instruction in the branching direction after the determination of the branching, allowing the traffic on the memory bus to be reduced. In other words, at the stage in which the branching is not determined, it is unclear whether or not the instruction is used so that there is a general prohibition on making a memory bus access after a cache miss. In addition, when branching is not yet determined an instruction on the target side is perfected to the instruction buffer, as long as the instruction is stored in the cache memory.

BRIEF DESCRIPTION OF THE DRAWINGS

FIG. 3 shows an example of an instruction sequence processed in the information processing device;

FIG. 12 is a timing chart for branching route (4) in FIG. 4;

FIG. 16 is a table showing instruction fetch operations in a first control example;

FIG. 17 is a table showing instruction fetch operations in a second control example;

FIG. 18 is a table showing instruction fetch operations in a third control example;

FIG. 19 is a table showing instruction fetch operations in a fourth control example;

FIG. 20 is a table showing specific pipeline operations when memory bus accesses have been limited by the aforementioned first and second control examples FIG. 21 is a table showing specific pipeline operations of an example of the prior art.

DESCRIPTION OF THE PREFERRED EMBODIMENTS

Embodiments of the present invention are explained below with reference to the figures. However, they are only intended by way of example and should be not be considered as restricting the scope of the invention.

Figure 1:
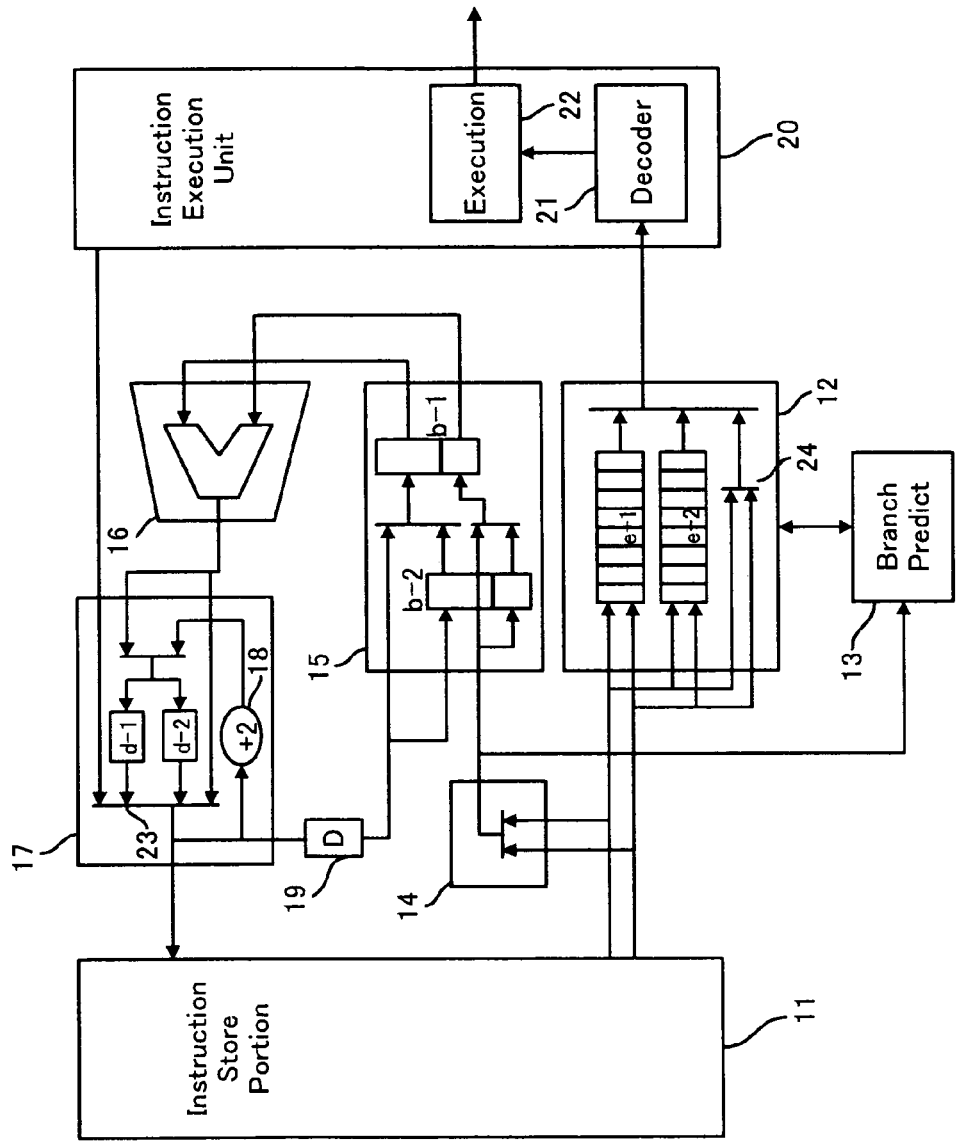
FIG. 1 is a schematic view of an embodiment of the information processing device according to the present invention.
Figure 2:
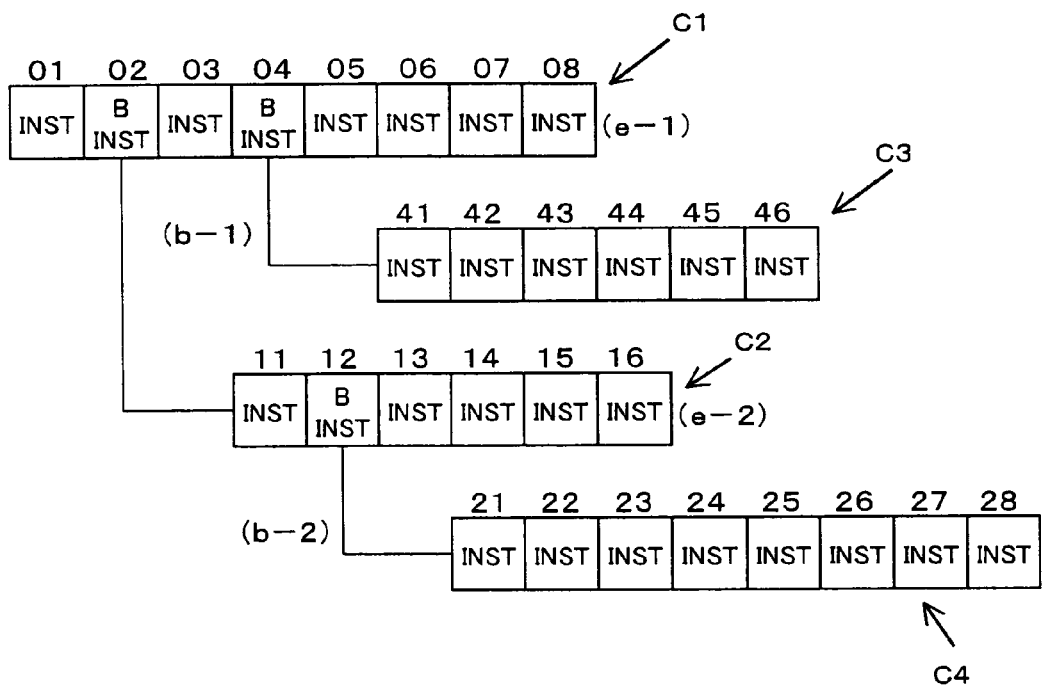
FIG. 2 is an explanatory diagram showing a basic form of an instruction sequence comprising a branching instruction.

FIG. 1 is a schematic view of a first embodiment of an information processing device according to the present invention which performs pipeline processing, and FIG. 2 shows a basic form of an instruction sequence comprising a branching instruction. This basic form of an instruction sequence is a configuration of instruction sequence C1 extending from instruction 01 to instruction 08, instruction sequence C2 extending from instruction 11 to instruction 16, instruction sequence C3 extending from 41 to 46, and instruction sequence C4 extending from 21 to 28. In addition, the instruction sequence in FIG. 2 comprises branching instruction 02 which branches to instruction sequence C2, branching instruction 04 which branches to instruction sequence C3 and branching instruction 12 which branches to instruction sequence C4.

The instruction sequence in which the branching instruction 12 is present inside the branch target instruction sequence C2 when the branching instruction 02 has branched and the next branching instruction 04 is present inside the original instruction sequence C1 when the branching instruction 02 does not branch, can be the most typical instruction sequence having branching instructions. Next, the configuration and each block operation of the information processing device according to the embodiment of the present invention will be explained with reference to FIGS. 1 and 2.

The information processing device according to this embodiment has the instruction store 11 in which the instruction sequences C1–C4 (shown for example in FIG. 2) are stored; the instruction buffering portion 12 which buffers the instruction read from the instruction store 11, and based on the branching prediction supplied by the branching prediction portion 13, supplies the instruction which is predicted to be executed next to the decoder 21; the decoder 21 which decodes the instruction which has been supplied by the instruction buffering portion 12; the instruction execution unit 20 provided with an instruction execution portion 22 which executes instructions in accordance with the control signal supplied by the decoder 21, and writes the results of the computations to registers and the like (not shown); and an instruction reading request portion 17 which selects the instruction address which is to be read next, using the selector means 23, from the program counter value, the branch target address received from the branch target address generating portion 16, or the addresses supplied by the instruction execution unit 20, and implements the instruction reading request to the instruction store 11.

In addition, the information processing device of the present embodiment comprises, in contrast with the prior art, a branching instruction detection portion 14 which reads an instruction from the instruction store 11 to the instruction buffering portion 12, and detects, at the stage of storage in instruction buffer e-1 or e-2, the presence of a branching instruction and transmits a relative address corresponding to the branch target instruction to the branch target address information buffering portion 15. Moreover, the information processing device of the present embodiment has a branch target address buffering portion 15 which buffers the relative addresses corresponding to the branch target instructions supplied by the branching instruction detection portion 14 and program counter values corresponding to the aforementioned branching instruction supplied via the delay circuit 19 by the instruction reading request portion 17, and a branch target address generating portion 16 which sums the program counter values, received from the branch target address information buffering portion 15, and the corresponding addresses so as to generate the branch target addresses.

Next, there will be a detailed explanation of each of the main constituent portions of the present embodiment of the information processing device. The instruction buffering portion 12 comprises at least the two instruction buffers e-1 and e-2. At certain times, from among the instruction sequences C1, C2, C3, C4 (shown in FIG. 2), instruction sequences being processed, and branch target instruction sequences from the branching instructions inside the instruction sequences being processed are stored in these instruction buffers e-1, e-2. In addition, the instruction reading request portion 17 reads, for example once every 2 instructions, instruction sequences stored in the instruction store 11. The instruction sequence read is buffered in the order of the addresses in instruction buffer e-1 or instruction buffer e-2 which has been selected in advance.

The fetch addresses corresponding to the instruction sequences stored in the instruction buffers e-1 and e-2 are respectively stored in fetch address registers d-1 and d-2 inside the instruction reading request portion 17 and are incremented by the address incrementing means 18.

For example, if the instructions 01, 02 from instruction sequence C1 are buffered in instruction buffer e-1, and the next instruction address 03 is buffered in the fetch address register d-1 of the instruction reading request portion 17, the instructions 03, 04 from the instruction sequence C1 are read and buffered after the preceding instruction sequences 01, 02 in the instruction buffer e-1.

On the other hand, if the instructions 11, 12 from instruction sequence C2 are buffered in instruction buffer e-2, and the next instruction address 13 is buffered in the fetch address register d-2 of the instruction reading request portion 17, the instructions 13, 14 from the instruction sequence C2 are read and buffered after the preceding instruction sequences 11, 12 in the instruction buffer e-2.

The instruction buffering portion 12 supplies to the decoder 21, from one of the instruction buffers e-1 or e-2, the instruction which, on the basis of the branching prediction of the branching prediction portion 13, is predicted to be the next to be executed. In this case, the branching prediction of the branching prediction portion 13 is, for example, performed with reference to the hint bit which indicates the branching priority level associated with the branching instruction. In addition, when it has become apparent that the instruction sequence (for example C1 or C2) which is buffered in the instruction buffering portion 12 e-1 or e-2 is not being used as a result of the branching of a branching instruction or the like being determined, the instruction sequence which is buffered at that time is invalidated, so that the branch target instruction sequence which is newly read (for example C4 or C3) can be buffered. Furthermore, a bypass route 24 which supplies the instructions read from the instruction store 11 to the decoder 21 without passing through the instruction buffers e-1 and e-2 is provided in the instruction buffering portion 12. By this means it is possible to supply the read instruction immediately to the execution unit 20.

The branching instruction detection portion 14 detects the presence of branching instructions inside the instruction sequence read from the instruction store 11. In this case, if just one of the 2 instructions read once is a branching instruction, the relative address corresponding to the branch target instruction of that branching instruction is sent to the branch target address information buffer 15.

On the other hand, if both of the 2 instructions read once from the instruction store 11 are branching instructions, the relative address corresponding to the branch target instruction of those branching instructions which has the greater possibility of branching is sent to the branch target address information buffering portion 15. In this case, the possibility of branching is assessed by the hint bits associated with the branching instructions. Furthermore, if there is not even one branching instruction present among the instructions read, nothing is done.

The branch target address information buffering portion 15 receives the fetch address corresponding to the branching instruction sent to the buffering portion 15 via the delay circuit 19 from the instruction reading request portion 17, and the relative address corresponding to the branch target instruction sent to buffering portion 15 from the branching instruction detection portion 14 (the fetch address and the relative address of the branch target instruction are referred to below as branch target address information). Which of the branch target address information will be buffered and which will be deleted is determined according to the priority level of the branch target address information buffered at that time, and the branch target address information which it has been decided to buffer is buffered.

For example, in the instruction sequence shown in FIG. 2, if the branching instruction 02 inside instruction sequence C1 is being processed, the address information of the branch target instruction 41 of the next branching instruction 04 contained in the instruction sequence C1 being processed is buffered in the first branch target address information register b-1. In addition, the address information of the branch target instruction 21 of the next branching instruction 12 contained in the branch target instruction sequence C2 of the first branching instruction 02 of instruction sequence C1 being processed is buffered in the second branch target address information register b-2.

If branch target address information is stored in the first branch target address information register b-1, the branch target address information buffering portion 15 sends, at a time of the invalidation of one of the instruction buffers e-1 or e-2 as a result of branching being determined or the like, the branch target address information buffered in the first branch target address information register b-1 to the branch target address generating portion 16. After this, the branch target address information buffered in the first branch target address information register b-1 is invalidated and it becomes possible to buffer the next branch target address information.

For example, if the address information of the branch target instruction 41 is stored in the first branching instruction address destination register b-1 and it has been determined that the branching instruction 02 has not branched, the instruction sequence C2 buffered in instruction buffer e-2 is invalidated. Then, the address information of the branch target instruction 41 is sent to the branch target address generating portion 16, and after this the address information of the first branch target address information register b-1 is invalidated and it becomes possible to buffer the next branch target address information of the instruction sequence C1.

On the other hand, if it has been determined, resulting from the execution of the branching instruction 02 by the instruction execution portion 22, that the branching has occurred, the branch target address information of the next branching instruction 04 inside the instruction sequence C1 being processed, which data is buffered in the first branch target address information register b-1, is invalidated. Furthermore, the address information of the branch target instruction 21 buffered in the second branch target address information register b-2 is transferred to the first branch target address information register b-1.

Furthermore, if the branch target instruction sequence C2 has not been read into the instruction buffering portion 12 and it has been determined that the branching which results from the execution of the branching instruction 02 has not occurred, the branching instruction sequence C2 has not yet been read so no invalidation occurs.

In addition, if the branch target instruction sequence C2 in the instruction buffering portion 12 has not been read and it has been determined that the branching which results from the execution of the branching instruction 02 has occurred, then the branching prediction has failed. In this case, the branch target address information buffered in both the first branch target address information register b-1 and the second branch target address information register b-2 is invalidated and the branch target instruction sequence C2 of the branching instruction 02 which has determined that the branching has occurred is read and the branching processing is repeated.

Next, the instruction reading request portion 17 comprises the two fetch address registers d-1 and d-2. The fetch address register d-1 buffers the address of the following instruction from the instruction sequence buffered in the instruction buffer e-1 of the instruction buffering portion 12, and the fetch address register d-2 buffers the instruction address of the following instruction from the instruction sequence buffered in the instruction buffer e-2. The address incrementing means 18 adds 2 to the values of the fetch address registers d1 and d2 as a function of the reading of 2 instructions each by the instruction buffers e-1 and e-2.

If there is no branching, the instruction reading request portion 17 adds 2 to the fetch address register d-1 and reads the continuous instruction sequence in order to the instruction buffer e-1. On the other hand, if there is branching, in other words if the instruction sequence C1 comprising the instruction 02 shown in FIG. 2 is executed, 2 is added to the address of branching instruction 02 in the fetch address register d-1, and the instruction sequence C1 comprising that branching instruction 02 is read in order. Further, 2 is added to the address of the branch target instruction 11 of that branching instruction 02 in the fetch address register d-2, and that branch target instruction sequence C2 is read in order to the instruction buffer e-2.

Because the present embodiment has a branching instruction detection portion 14 which detects whether a branching instruction is present in the instruction sequence read from the instruction store 11, it is possible to detect the branching instruction from inside the read instruction sequence before the decoding of the instruction buffered in the instruction buffering portion 12.

In addition, if an instruction sequence comprising a branching instruction is being processed, it is advantageous to provide at least the first and second instruction buffers e-1 and e-2 which store the instruction sequence being processed and the first branch target instruction sequence, with the result that the hardware of the instruction buffering portion 12 which stores the branch target instruction sequence can be reduced.

In addition, the branch target address information of the next branching instruction inside the instruction sequence which is being processed and the branch target address information of the next branching instruction inside the first branch target instruction sequence are stored in the first and second branch target address information registers b-1 and b-2. For this reason, whether or not branching occurs by the execution of the branching instruction, it is possible to read the branch target instruction sequence immediately using that stored branch target address information, reducing the confusion of the pipeline processing resulting from the following branching instruction.

FIG. 3 shows an actual example of a consecutive instruction sequence comprising branching instructions. The instruction sequence in FIG. 3 is made up of an instruction sequence in which the addresses run from 01 to 08, an instruction sequence in which the addresses run from 11 to 16, an instruction sequence in which the addresses run from 21 to 28 an instruction sequence in which the addresses run from 31 to 34, an instruction sequence in which the addresses run from 41 to 46, an instruction sequence in which the addresses run from 51 to 55, and an instruction sequence in which the addresses run from 61 to 66. In addition, the branch target address of the condition branching instruction 02 is 11, and the branch target instruction sequence of the condition branching instruction 02 is the instruction sequence in which the addresses run from 11 to 16.

Figure 4:
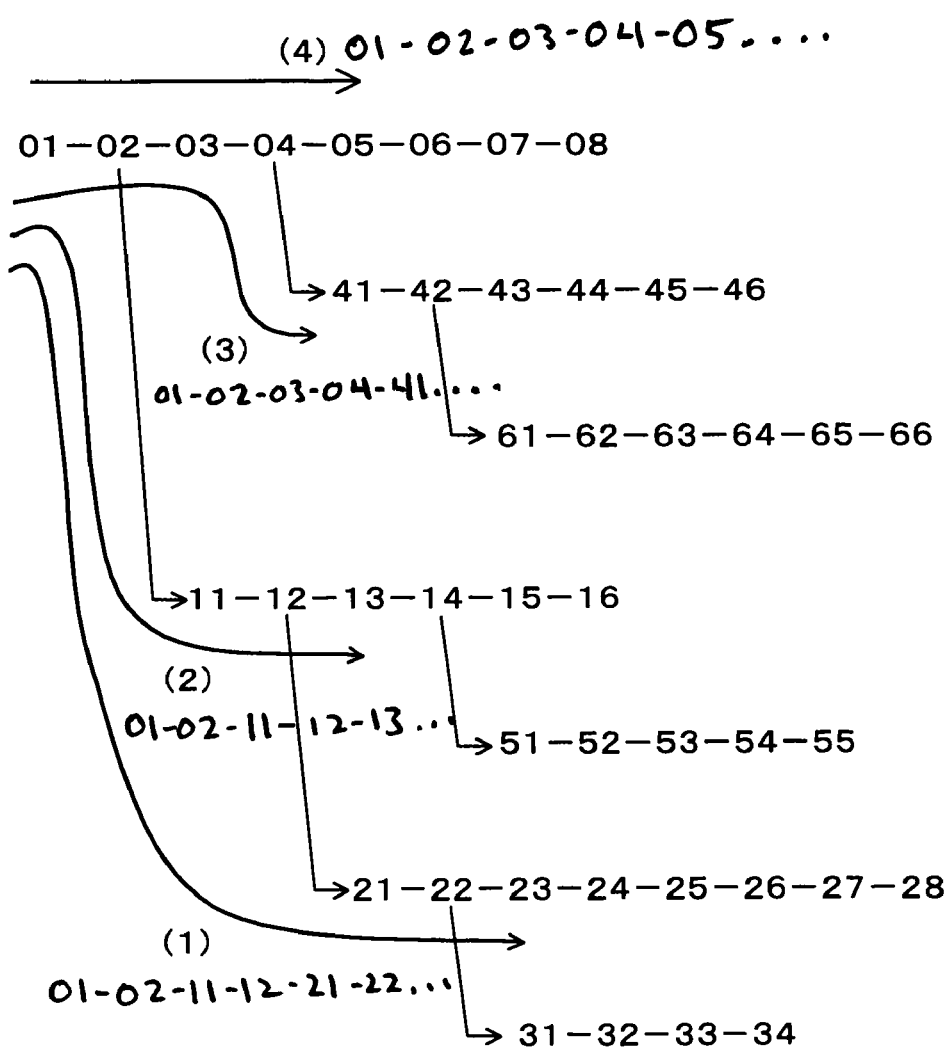
FIG. 4 is an explanatory diagram showing the branching route of the instruction sequence in FIG. 3.

FIG. 4 shows the branching route of the instruction sequence in FIG. 3. For example, the branching route (1) shown in FIG. 4 has branching continuously at instruction 02 and instruction 12, and the branching route (2) branches at instruction 02 and does not branch at instruction 12. In addition, the branching route (3) does not branch at instruction 02 and branches at instruction 04, the branching route (4) does not branch either at instruction 02 or at instruction 04. The operations of each of the branching routes (1) to (4) will be explained below with reference to a timing chart.

Figure 5:
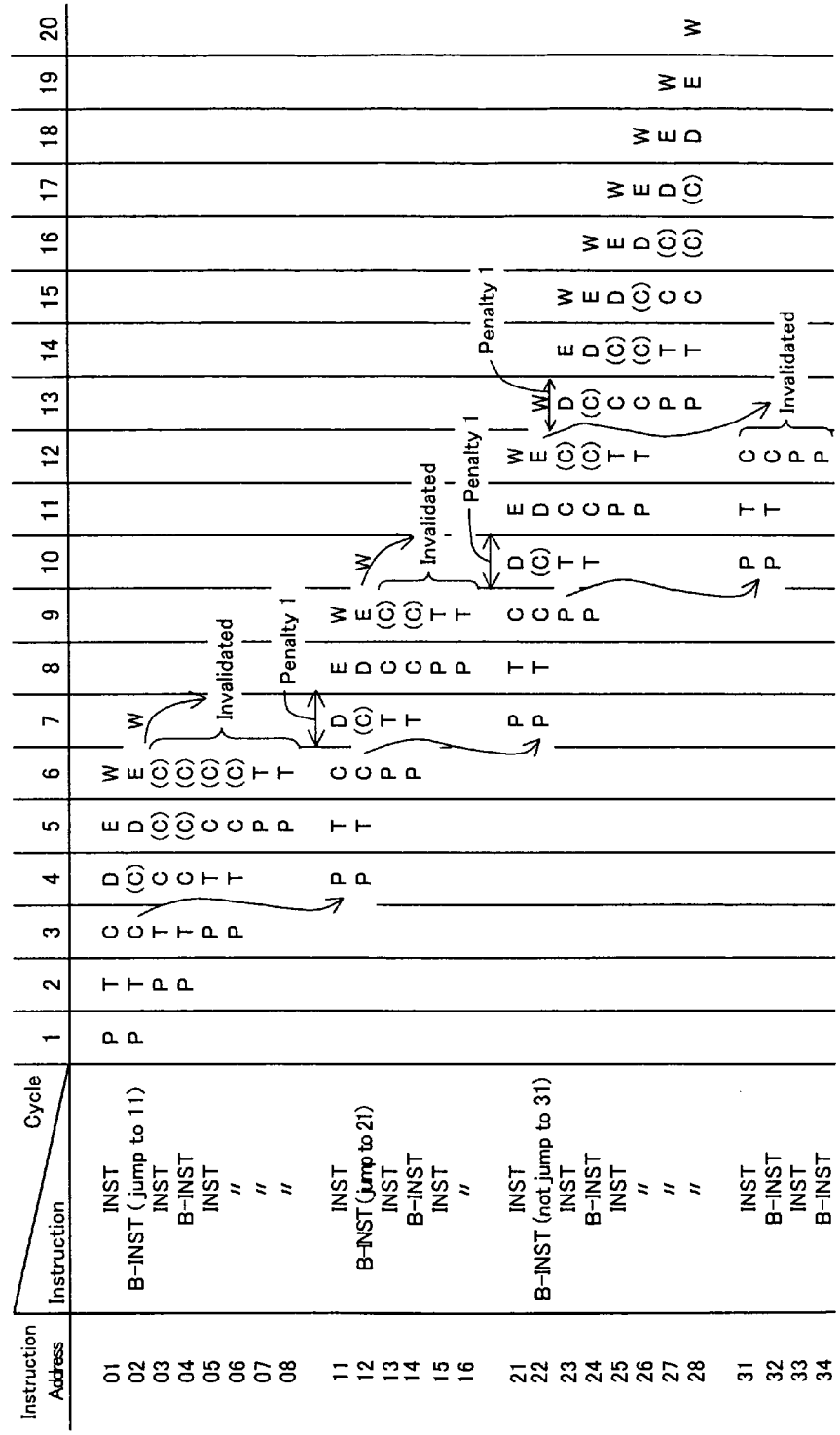
FIG. 5 is a timing chart for the branching route (1) in FIG. 4.

FIG. 5 shows the timing chart of the case in which the branching route (1) shown in FIG. 4 has been executed by the information processing device according to an embodiment of the present invention. The signals P, T, C, D, E, W of each of the cycles in FIG. 5 represent the 6 stages of the pipeline processing for one instruction, and an explanation of the contents of the processing of each stage will be given first.

The fetch request stage (P stage) is a pipeline stage in which the instruction reading request portion 17 selects a reading instruction address from the addresses which have been supplied by the branch target address generating portion 16 or the instruction execution unit 20 and the addresses which have been incremented by the address incrementing means 18, and performs an instruction read request to the instruction store 11. Furthermore, the cache stage (Tstage) is a pipeline stage which makes preparations for fetching the instruction of fetching requested address inside the instruction store 11.

The instruction fetching stage (C stage) is a pipeline stage in which the instruction read from the instruction store 11 is buffered in instruction buffer e-1, e-2, the branching instruction detection portion 14 checks whether there is a branching instruction among the read instructions and if a branching instruction is present, the relative address corresponding to the branch target instruction is sent to the branch target address information buffering portion 15 and the read instruction is sent to the decoder 21 via the bypass route so that the next instruction can be read.

The decoding stage (D stage) is a pipeline stage in which an instruction which has been received from the instruction buffering portion 12 is decoded in the decoder 21 and a control signal is generated. In addition, the execution stage (E stage) is a pipeline stage in which an instruction is executed in the instruction execution portion 22 on the basis of the control signal generated by the decoder 21. The branching of the branching instruction is assessed in this execution stage. The writing stage (W stage) is a pipeline stage in which the result obtained from the execution of the instruction is written to a register or the like.

Of the 6 aforementioned stages, it is the consecutive execution operations of the execution stage E which make it possible to perform pipeline processing without pipeline processing confusion and to make most efficient use of the resources of the instruction execution unit 20.

The timing chart in FIG. 5 will be explained next. FIG. 5 is a timing chart for the route (1) in FIG. 4, and shows consecutive branching at the branching instruction 02 and the branching instruction 12.

An instruction fetch request is performed (P stage) in cycle 1 for the instructions 01, 02 according to the address inside the fetch address register d-1, and preparations to fetch the instruction are made in cycle 2 (T stage). Instructions 01, 02 are read from the instruction store 11 at cycle 3, and because both instruction buffers e-1 and e-2 are empty, the instructions are stored in instruction buffer e-1. At this time, 2 is added to the fetch address register d-1 by the address incrementing means 18, and the address 03 which follows instructions 01, 02 is buffered.

Furthermore, in cycle 3 the branching instruction detection portion 14 detects that the instruction 02 is a branching instruction, and the branch target address information of the branching instruction 02 is buffered (C stage) in the first branch target address information register b-1.

Figure 6:
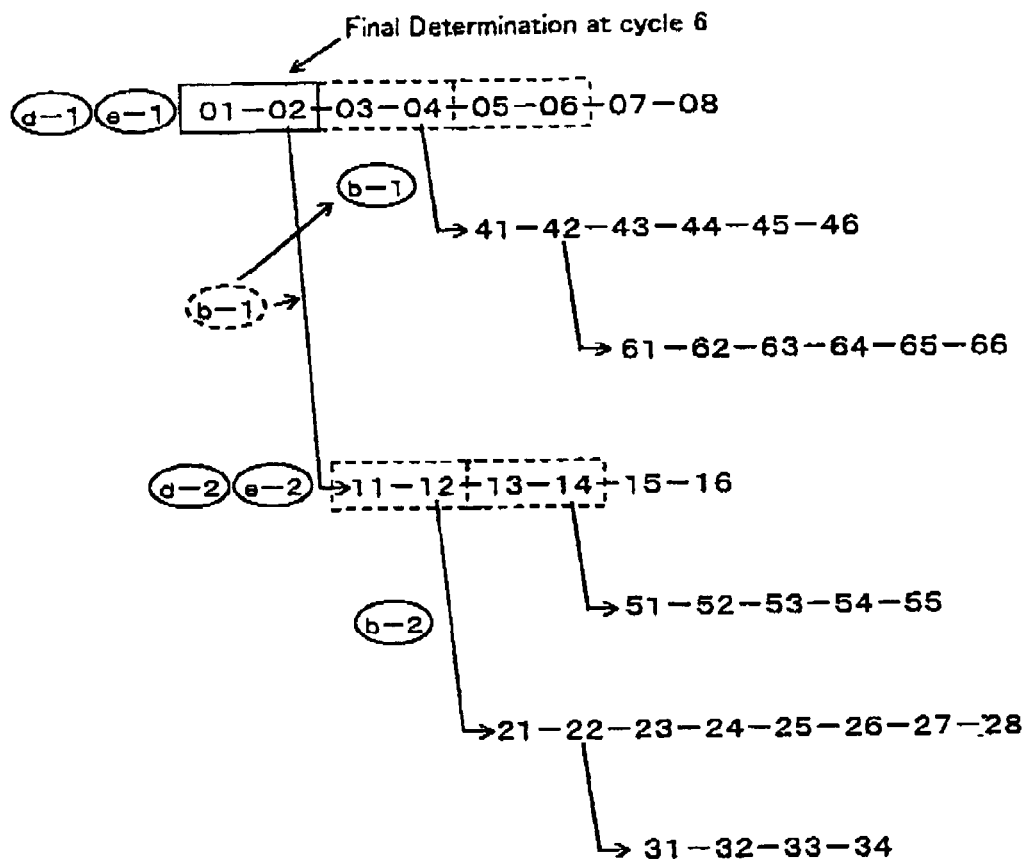
FIG. 6 is an explanatory diagram showing the contents of the instruction buffer at cycle 3 of branching route (1)

FIG. 6 shows the contents of the instruction buffer etc. when cycle 3 has finished. Instruction sequence 01–08 are stored in instruction buffer e-1 corresponding to fetch address register d-1 but at the time when cycle 3 has stopped, only instructions 01, 02 are stored in instruction buffer e-1. In addition, the branch target instruction sequence 11–16 of the branching instruction 02 are stored in the instruction buffer e-2 corresponding to fetch address register d-2 but it is not yet been stored when cycle 3 finishes.

According to the above, in cycle 3, the branch target address information (the address information of instruction 11) of the first branching instruction 02 contained in the instruction sequences 01–08 which are being processed at this time are buffered in the branch target address information register b-1. However, the address information of the branch target instruction 11 buffered in branch target address information register b-1 is buffered in fetch address register d-2 after this so that it is invalidated at the following cycle. The address information of the second branch target instruction 41 of the next branching instruction 04 of the instruction sequences 01–08 which are being executed is stored newly in branch target address information register b-1. It is necessary to wait until the E stage of cycle 6 for the ultimate decision as to whether the branching instruction 02 branches.

On the other hand, the branch target address information of the first branching instruction 12 contained in branch target instruction sequence 11–16 which are being read at that time is buffered in branch target address information resister b-2. However, in cycle 3 the branching instruction 12 has not yet been read so that there is no buffered data and in the following cycle the address information of the branch target instruction 21 of the branching instruction 12 is buffered in branch target address information register b-2.

Next, in cycle 4 in FIG. 5, the branch target address generating portion 16 calculates the branch target address 11 of branching instruction 02 from the relative address corresponding to branch target in the branch target address information register b-1 and from the current address from the fetch address register d-1, and buffers the aforementioned address 11 in the fetch address register d-2. The instruction reading request portion 17 executes the request to read branch target instructions 11 and 12 on the basis of the addresses in the fetch address register d-2. Directly after this, the address incrementing portion 18 adds 2 to the addresses from the fetch address register d-2 and the instruction address 13 which follows the branch target instructions 11 and 12 is buffered in fetch address register d-2. In addition, as stated above, the first branch target address information register b-1 invalidates the branch target address information of the branching instruction 02 which is no longer being used and buffers the address information of the branch target instruction 41 of the newly read branching instruction 04.

Until the fetch request (P stage) of branch target instructions 11 and 12 are executed in cycle 4, in cycles 2 and 3 the fetch requests (P stage) of the instructions 03, 04 and instructions 05, 06 which follow branching instruction 02 are executed in every cycle. In cycles 5, 6 which are executed after the fetch requests of branch target instructions 11 and 12 (P stage), the fetch request of instructions 07 and 08 which follow 06 and the fetch requests of instructions 13 and 14 which follow branch target instructions 11 and 12 are executed alternately.

In this case, the instruction sequence which follows branch target instruction 11 is buffered in the empty instruction buffer e-2. However, even though the instruction buffer e-2 is empty, if the branching possibility level of branching instruction 02 is low, it is not necessary to store the branch target instruction sequence 11–16 of branching instruction 02 in instruction buffer e-2 because the branch target address information of branching instruction 02 is stored in the first branch target address information register b-1.

In cycle 5, branching instruction 02 proceeds to D stage, for example, if it is predicted that branching instruction 02 will branch according to the hint bit added on to branching instruction 02, the branch target instruction sequence 11, 12 read to instruction buffer e-2 is supplied to D stage in the following cycle, instead of instruction sequence 03–06 which follow instruction 02 buffered in instruction buffer e-1. However in the case of the instruction sequence in FIG. 5, because the branch target instruction sequences 11 and 12 have not yet been read to the instruction buffer e-2 at the time when cycle 6 begins, the branch target instruction sequences 11 and 12 are supplied to D stage from the next cycle 7.

In cycle 6, branching instruction 12 is read from the instruction store 11 (C stage), the branching instruction detection portion 14 detects that there is a branching instruction and the address information of the branch target instruction 21 of branching instruction 12 is buffered in the second branch target address information register b-2. At this time, the two instruction buffers e-1 and e-2 are being used so that they cannot buffer a new branch target instruction sequence and the address information of the second branch target address information register b-2 is buffered until either of the instruction buffers e-1 or e-2 is invalidated and an empty space is generated.

At this time the constitution according to this embodiment is in its the most characteristic state. In other words, the instruction sequence 01–08 which are being processed are stored in the instruction buffer e-1 using the fetch address register d-1, the branch target instruction sequences 11–16 of branching instruction 02 are stored in the instruction buffer e-2 using the fetch address register d-2, the branch target address information of the next branching instruction 04 of the instruction sequences 01–08 which are being processed are stored in the first branch target address information register b-1, and the branch target address information of the next branching instruction 12 of branching instruction sequences 11–16 are stored in the second branch target address information register b-2. The system waits for the result of the execution E stage of the branching instruction 02 in cycle 6.

In cycle 6, the decoded branching instruction 02 proceeds to E stage, and the it is assessed whether or no there is branching. According to the route (1) in FIG. 4, when it is determined that there is branching to instruction 11, in order to be able to newly read branch target instructions, fetch address register d-1 and instruction buffer e-1 which relate to instruction sequences 03–08 which follow instruction 02 are invalidated and, furthermore, the first branch target address information register b-1 which buffers the branch target address information of the branching instruction 04 is invalidated. Then, the address information of the branch target instruction 21 of branching instruction 12 buffered in the second branch target address information register b-2 is sent to the first branch target address information register b-1.

Figure 7:
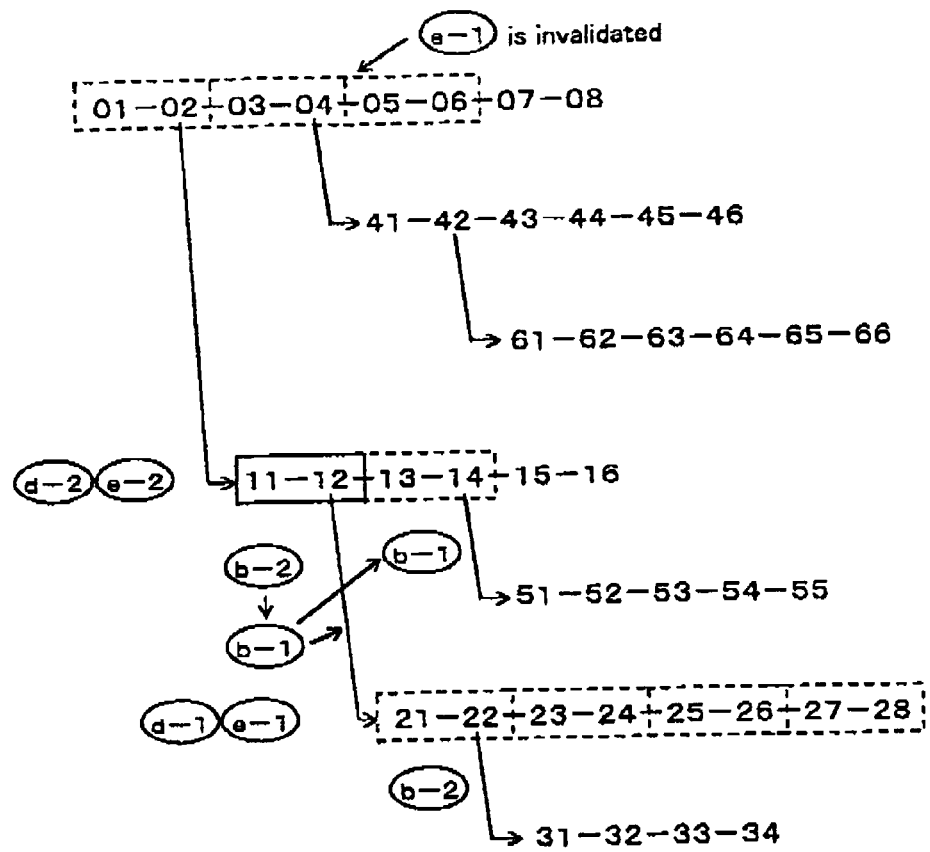
FIG. 7 is an explanatory diagram showing the contents of the instruction buffer at cycle 6 of branching route (1)

FIG. 7 is an explanatory figure showing the contents of the instruction buffers etc when cycle 6 has finished. In cycle 6, because it has been determined that the branching instruction 02 has branched to instruction 11, the instruction sequence 03–06 which follow instruction 02 buffered in instruction buffer e-1 are invalidated. Furthermore, as a result of the branch target address (21) which is generated from the data of the first branch target address information register b-1 being stored in fetch address register d-1, it becomes possible after this to store in instruction buffer e-1 the following instruction sequence 21–28 from instruction 21.

In addition, as stated above, the address information of branch target instruction 21 of branching instruction 12 buffered in the second branch target address information register b-2 is sent to the first branch target address information register b-1. Then, in the following cycle, the address information of branch target instruction 51 of the next branching instruction 14 inside the instruction sequences 11–16 which are being processed are buffered in the first branch target address information register b-1 and the address information of branch target instruction 31 of the branching instruction 22 inside the branch target instruction sequence 21–28 are buffered in the second branch target address information register b-2.

To return to FIG. 5, in the next cycle 7, the branch target generating portion 16 calculates branch target addresses (21) from the branch target address information of the branching instruction 12 buffered in the first branch m target address information register b-1, and the instruction reading request portion 17 executes the fetch requests of instruction sequences 21 and 22. Then, the address of fetch address register d-1 is incremented, and the address (23) following instructions 21 and 22 is buffered in fetch address register d-1. In addition, after the buffered branch target address information has been sent to the branch target address generating portion 16, the first branch target address information register b-1 is invalidated.

In cycle 8, instruction 11 is executed (E stage) by the instruction execution portion 22. The E stage of this instruction 11 is performed delayed by one cycle from the E stage of instruction 02. This is because the P stage in which the fetching of the instruction 11 begins was delayed, and at the time of cycle 7 the transfer to the E stage of instruction 11 did not take place on time. However, if the E stage of branching instruction 02 is delayed because of the preceding instruction sequence, it is possible to perform a transfer to the E stage of the branch target instruction 11 at the next cycle of the E stage of branching instruction 02. In this case, no confusion at all is produced in the pipeline processing.

In cycle 8, the branch target address information of branching instruction 14 is stored in the branch target address information register b-1, and branching instruction 12 proceeds to stage D. If it is predicted that branching instruction 12 will branch according to the hint bit added on to branching instruction 12, following the route (1) in FIG. 4, the branch target instruction sequences 21, 22 buffered in instruction buffer e-1 will be transferred to stage D from the following cycle, instead of instruction sequence 13–14 which follow instruction 12 buffered in instruction buffer e-2. However in the case of the instruction sequence in FIG. 5, because the branch target instruction sequences 21 and 22 have not yet been read to the instruction buffer e-2 at the time when cycle 9 begins, the branch target instruction sequences 21 and 22 are supplied to stage D from the next cycle 10.

In cycle 9, branching instruction 22 is read from the instruction store 11, and the branching instruction detection portion 14 detects that there is a branching instruction and the branch target address information of the branching instruction 22 is buffered in the second branch target address information register b-2. Here, the decoded branching instruction 12 proceeds to stage E, and it is assessed whether there is branching. In the example here, it is determined that there has been branching to instruction 21 so that the branch target address information of the branching instruction 14 buffered in the first branch target address information register b-1 is invalidated. Then, the branch target address information of branching instruction 22 is sent from branch target address information register b-2 to branch target address information register b-1 and buffered, and fetch address register d-2 which is related to instruction sequence 13–16 which follow instruction 12 and instruction buffer e-2 are invalidated.

Figure 8:
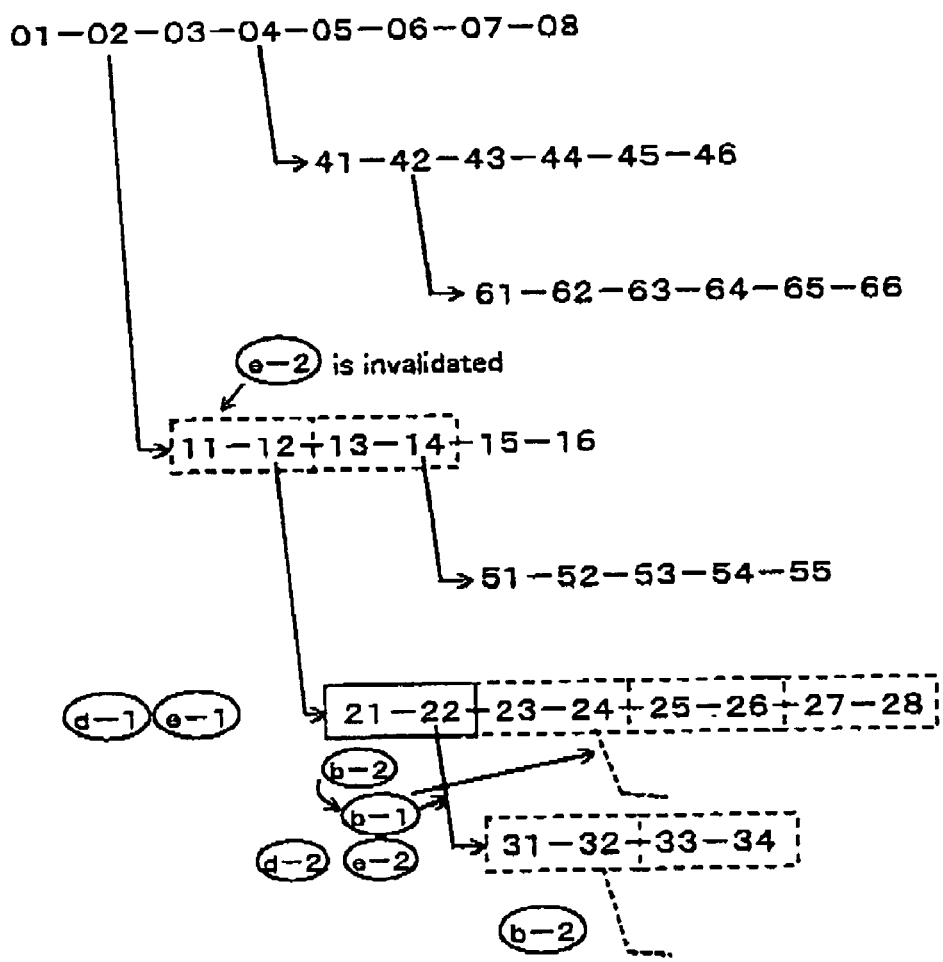
FIG. 8 is an explanatory diagram showing the contents of the instruction buffer at cycle 9 of branching route

FIG. 8 is an explanatory figure showing the contents of the instruction buffers etc when cycle 9 has finished. In cycle 9, because it has been determined that the branching instruction 12 has branched to instruction 21, the instruction sequence 13–14 which follow instruction 12 buffered in instruction buffer e-2 are invalidated. Furthermore, as a result of the branch target address (31) which is generated from the data of the first branch target address information register b-1 being stored in fetch address register d-2, it becomes possible after this to store in instruction buffer e-2 the following instruction sequence 32–34 from instruction 31.

At this time, the address information of branch target instruction 31 of branching instruction 22 buffered in the second branch target address information register b-2 is sent to the first branch target address information register b-1. Then, in the following cycle, the branch target address information of the next branching instruction 24 inside the instruction sequence 21–28 which are being processed is buffered in the first branch target address information register b-1, and the branch target address information of branching instruction 32 inside the branch target instruction sequence 31–34 is buffered in the second branch target address information register b-2.

To return to FIG. 5, in the next cycle 10, the branch target generating portion 16 calculates branch target addresses from the branch target address information of the branching instruction 22. Then the instruction reading request portion 17 executes the fetch requests of instruction sequence 31 and 32. After this, the processing is generally as described above but in cycle 12 the branching instruction 22 proceeds to stage E and it is determined that branching is not occurring so that the instruction 31 and 32 buffered in instruction buffer e-2 are invalidated and the pipeline processing of instruction sequences 23–28 is preformed in cycles 13–20.

In order to perform pipeline processing at high speed, as stated above, it is necessary to continue the execution stage (E stage). In the constitution of the information processing device according to the present embodiment, when it has been predicted that a branching instruction will branch and the branching instruction branches as predicted, usually since an instruction fetch was performed 10 well before that branching instruction so that there is no E stage delay, in other words there is no penalty. On the other hand, if, contrary to the prediction, that branching instruction has not branched, after the E stage of the branching instruction the decoding stage (D stage) of the branch target instruction is performed so that the branching penalty 1 occurs.

However, if E stage of the branching instruction is performed early and the fetch request stage (P stage) of the branch target instruction is delayed, a branching penalty 1 occurs. In addition, if the first instruction read to instruction buffers e-1 or e-2 is a branching instruction, the E stage of the branch target instruction is delayed severely and the worse branching penalty 2 occurs.

In the same way, in the constitution of the information processing device according to the present embodiment, when it has been predicted that a branching instruction will not branch and the branching instruction does not branch as predicted, usually an instruction fetch was performed well prior to that branching instruction so that there is no penalty. On the other hand, if, contrary to the prediction, that branching instruction has in fact branched, after the E stage of the branching instruction the decoding stage (D stage) of the branch target instruction is performed so that the branching penalty 1 occurs However, if the first instruction read to the instruction buffers e-1 and e-2 is a branching instruction, E stage of the branch target instruction is severely delayed and the worse branching penalty 2 occurs.

In the case of the branching route (1) shown in FIG. 5, the branching penalty generated in relation to the first branching by instruction 02 is, as shown in the figure, the cycle time period 1 in cycle 7, the branching penalty generated in relation to the second branching by instruction 12 is, as shown in the figure, the cycle time period 1 in cycle 10 and the branching penalty generated in relation to the third branching by instruction 22 is, as shown in the figure, the cycle time period 1 in cycle 13.

Figure 9:
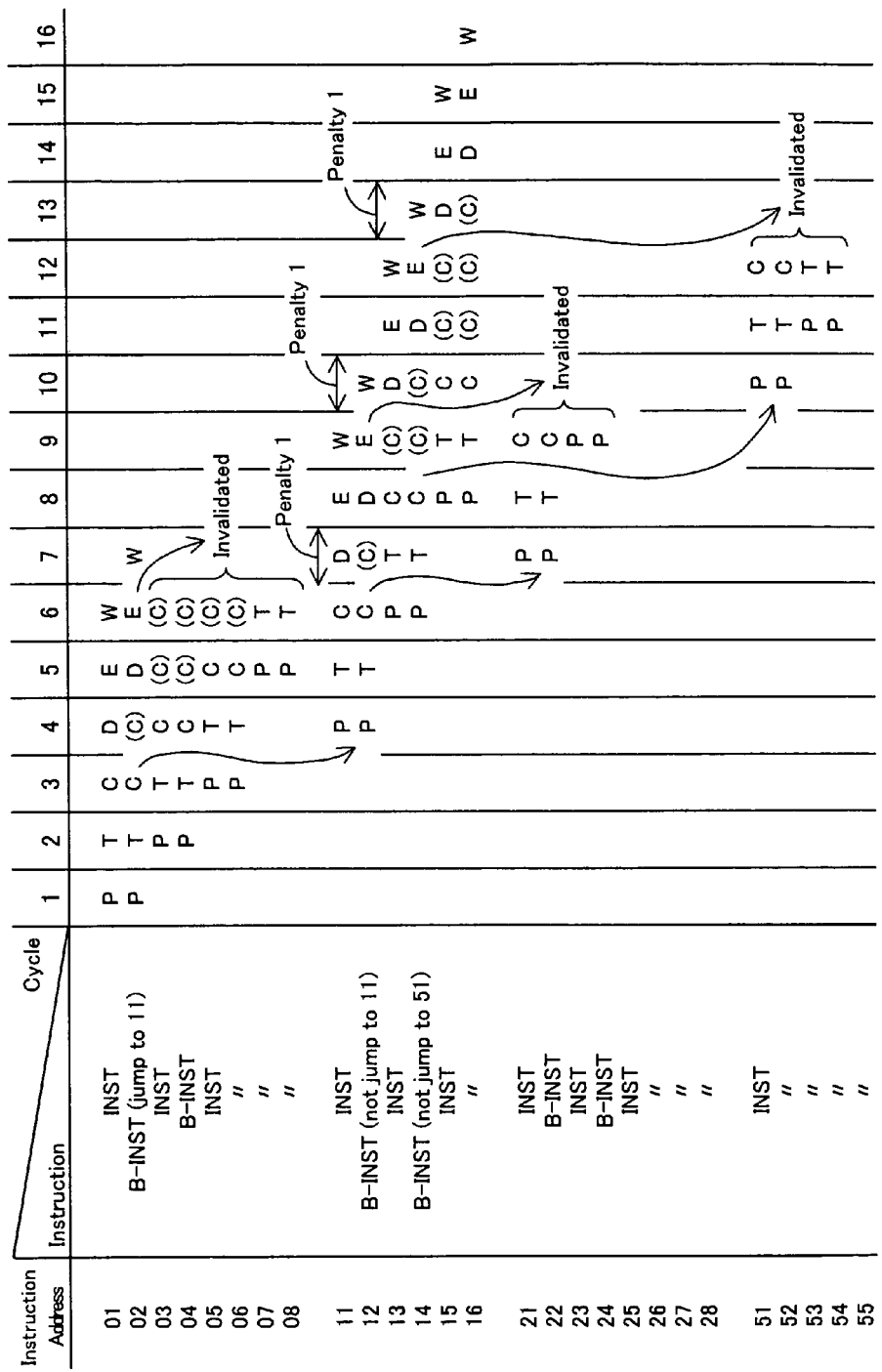
FIG. 9 is a timing chart for branching route (2) in FIG. 4.

FIG. 9 shows the timing chart for the instruction route (2) shown in FIG. 4, and branching occurs at branching instruction 02 but does not occur at branching instruction 12. The branching at branching instruction 02 is the same as at branching route (1), the process when branching does not occur at branching instruction 12 is the same as the process when branching does not occur at branching instruction 22 of the branching route (1). In other words, in FIG. 9, if it has been determined that the branching instruction 12 does not branch at the execution stage (E stage)of cycle 9, the branch target instruction sequences 21 and 22 read to the instruction buffer e-1 are invalidated and the following instruction sequence 13–16 are executed.

In the case of route (2), in the same way as in route (1), the branching penalty generated in relation to the first branching by instruction 02 is the cycle time period 1 in cycle 7 and the branching penalty generated in relation to the second branching by instruction 12 is the cycle time period 1 in cycle 10, while the branching penalty generated in relation to the third branching by instruction 14 is the cycle time period 1 in cycle 13.

Figure 10:
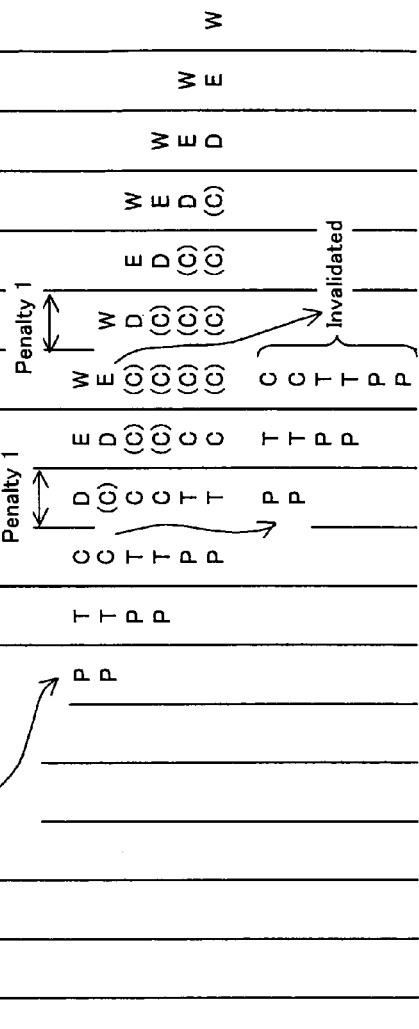
FIG. 10 is a timing chart for branching route (3) in FIG. 4.

FIG. 10 shows the timing chart for the instruction route (3) shown in FIG. 4, and branching does not occur at branching instruction 02 but does occur at branching instruction 04. The process in which branching does not occur at branching instruction 02 is the same as the process when branching does not occur at branching instruction 22 of the branching route (1), and the process when branching does occur at branching instruction 04 is the same as the process when branching does occur at branching instruction 02 of the branching route (1).

In the case of branching route (3), in the same way as in branching routes (1) and (2), the branching penalty generated in relation to the first branching by instruction 02 is the cycle time period 1 in cycle 7 and the branching penalty generated in relation to the second branching by instruction 04 is the cycle time period 1 in cycle 10, while the branching penalty generated in relation to the third branching by instruction 42 is the cycle time period 1 in cycle 13.

Figure 11:
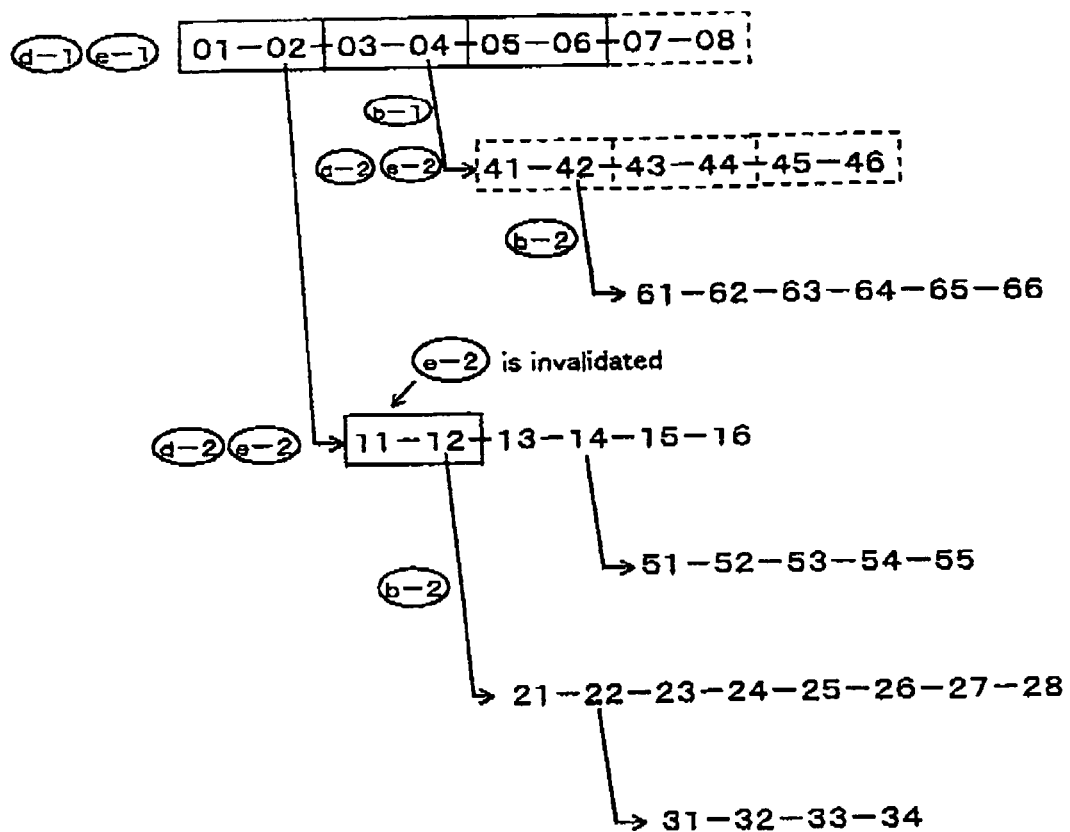
FIG. 11 is an explanatory diagram showing the contents of the instruction buffer at cycle 6 of branching route (3)
Figure 13:
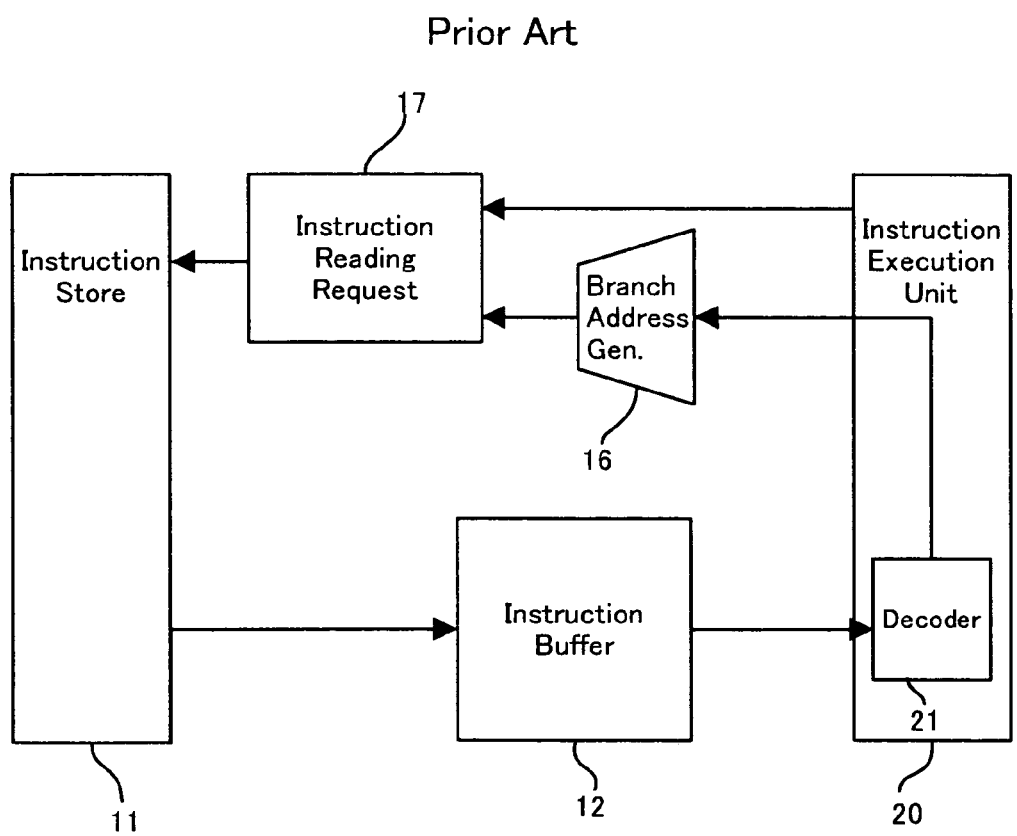
FIG. 13 is a schematic view of a conventional information processing device.

FIG. 11 is an explanatory figure showing the contents of the instruction buffers etc when cycle 6 has finished, for branching route (3) in FIG. 10. In cycle 6, because it has been determined that the branching instruction 02 has not branched to instruction 11, the instruction sequence 11 and 12 buffered in instruction buffer e-2 are invalidated. Then, as a result of the branch target address (41) which is generated from the data of the first branch target address information register b-1 being stored in the fetch address register d-2, it becomes possible after this to store in instruction buffer e-2 the following instruction sequences from instruction 41.

In addition, the address information of the branch target instruction 21 of branching instruction 12 buffered in the second branch target address information register b-2 is invalidated and in the following cycle the address information of the branch target instruction 61 of the branching instruction 42 is buffered in the second branch target address information register b-2.

FIG. 12 shows the timing chart for the instruction route (4) shown in FIG. 4, and branching does not occur at branching instruction 02 and branching instruction 04. The non-occurrence of branching at branching instruction 02 is the same as in branching route (3), and the process in which branching does not occur at branching instruction 04 is the same as the process when branching does not occur at branching instruction 22 of the branching route (1).

In the case of branching route (4), the branching penalty generated in relation to the first branching by instruction 02 is the cycle time period 1 in cycle 7 and the branching penalty generated in relation to the second branching by instruction 04 is the cycle time period 1 in cycle 9.

It is therefore apparent that this embodiment of the information processing device according to the present invention has a branching instruction detection portion 14 which detects whether a branching instruction is present inside the branching instruction sequence read from the instruction store 11, so that it is possible to detect a branching instruction from inside the read instruction sequence, before the instruction buffered inside the buffer instruction portion 12 is decoded.

In addition, when an instruction sequence comprising a branching instruction is being processed, it is advantageous to provide at least the first and second instruction buffers e-1 and e-2 which store the instruction sequence which is being processed and the first branching instruction sequence, so that the hardware of the instruction buffering portion 12 which stores the branch target instruction sequence can be minimized.

In addition, the branch target address information of the next branching instruction inside the instruction sequence which is being processed and the branch target address information of the next branching instruction inside the first branch target instruction sequence are stored in the first and second branch target address registers b-1 and b-2, so that, whether the system is in the branching state or in the non-branching state by processing the branching instruction, it is possible to read the branch target instruction sequence immediately by this stored branch target address information, and the confusion in the pipeline processing due to consecutive branching instructions can be reduced.

Furthermore, in the present embodiment explanation is given for the case in which there are respectively two instruction buffers, e-1 and e-2, and two branching instruction address registers b-1 and b-2, but there is no limitation to two, and three or more of such components is also possible.

In the present invention as described above, if it is detected, before the instruction read from the instruction store is stored in the instruction buffer, that a branching instruction is present the branching address information of the detected branching instruction is stored. Therefore, it is possible to limit the increase in the hardware of the instruction buffer etc. and reduce the confusion in the pipeline processing due to consecutive branching instructions.

Second Embodiment

Figure 14:
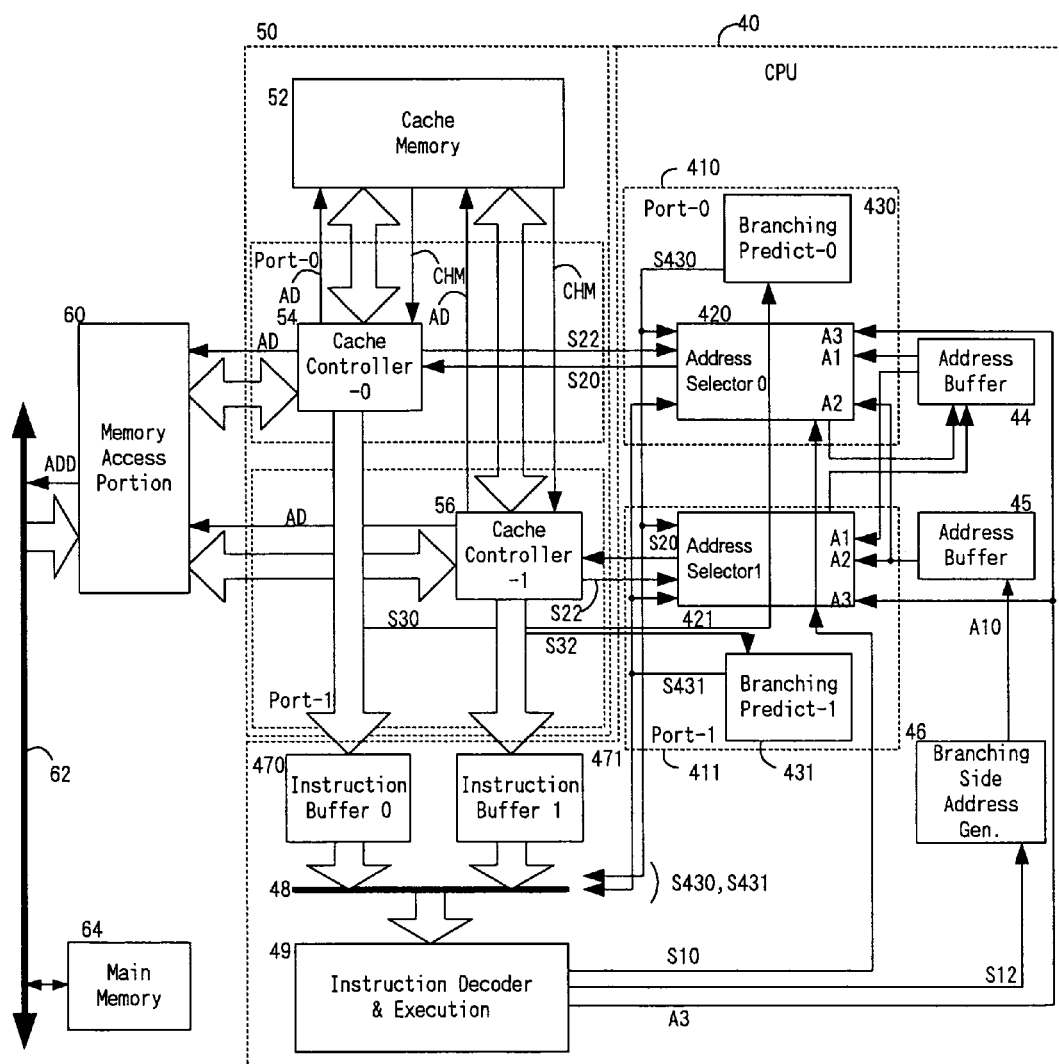
FIG. 14 is a system diagram of an embodiment of the information processing device according to the present invention.

FIG. 14 is a timing diagram for the information processing device according to the second embodiment of the present invention. The information processing device shown in FIG. 14 is a microprocessor and it has a chip-mounted CPU40, a cache memory unit 50 and a memory bus access portion 60. To the left of the memory bus access portion 60 is outside the chip and the main memory 64 is connected via the external memory bus 62.

The CPU 40 comprises an instruction decoder and execution portion 49 which decodes instructions and executes those instructions. The CPU 40 shown in FIG. 14 comprises dual-instruction-fetch-type instruction fetch portions 410, 411 which fetch both branching instruction sequential side and branching instruction target side instructions at the same time. Furthermore, CPU 40 has instruction buffers 470, 471 which store instructions which have been fetched both on the sequential side and on the target side. Instructions selected by the selector 48 from among the instructions in the aforementioned instruction buffers are supplied to the instruction decoder 49. The selection by the selector 48 is made in accordance with the branching instruction branching prediction signals S430, S431 mentioned below.

An instruction which has been decoded by the instruction decoder is executed by the instruction execution portion 49 and the effects of the execution are written to specified registers etc. (not shown). The instruction decoder and instruction execution portion 49 supplies the branch target address information S12 of the branching instruction to the branching side address generating portion 46. The branching side address generating portion 46 generates a branch target address A10 in accordance with that branch target address information S12 and supplies it to the branch target address buffer 45. The branch target address buffer 45 buffers this branch target address, which is a supplied target side instruction address, for later instruction fetches. Furthermore, sequential side address buffer 44 increments, generates and buffers sequential side instruction addresses.

Instruction fetch portions 410, 411 respectively comprise selector portions 420 and 421. Sequential side addresses A1 from the sequential side address buffer 44, target side branch target addresses A2 from the branch target address buffer 45 and addresses A3 which have been generated as a result of instruction execution operations from the instruction execution portion 49 are respectively supplied to the address selector portions 420, 421 and addresses selected form among these addresses are supplied to the cache memory unit 50 together with instruction fetch requests S20. The instruction fetch portions 410, 411 become, depending on the branching determining signals S10 supplied by the instruction execution portion 49, either sequential side instruction buffering portions, on the one hand, or target side instruction fetch portions, on the other. In addition, depending on the branching determining signals S10, classification of either a prefetch at a stage in which branching has not yet been determined or as a fetch after branching has been determined, is added on to the instruction request S20 and provided to the cache memory unit 50.

The cache memory unit 50 comprises the cache memory unit 52 and the cache controllers 54, 56. The cache controllers 54, 56 fetches fetch instructions from the cache memory 52 or the main memory 64 depending on the fetch request S20 from the instruction fetch portions 410, 411. Accordingly, the cache memory unit 50 becomes a 2 port unit which can receive both sequential side and target side instruction fetch requests at the same time. The cache controllers controller 54, 56 allocate addresses AD to the cache memory and fetch instructions. Then, the hit/miss CHM signal which indicates whether there has been a cache hit or a cache miss with those instruction fetches is transmitted back to the respective controllers 54, 56 from the cache memory 52.

When a cache hit has occurred as a result of an instruction fetched from a cache memory in accordance with the fetch request S20, each cache controller 54, 56 supplies that fetched instruction to the corresponding instruction buffer 470, 471 and stores it. When there has been a cache miss, the cache controllers 54, 56 execute, in accordance with an algorithm mentioned later, a memory bus access request to the memory bus access portion 60 in order to fetch instructions from the main memory 64. However, in this embodiment, this memory bus access is limited to some extent at the stage in which branching has not yet been determined.

The memory bus access portion 60 is connected to the main memory 64 via the external memory bus 62, and the memory bus access portion 60 controls the memory bus 62 and performs memory bus accesses in accordance with the fetch requests to the main memory 64 from the cache controllers 54, 56. The instructions fetched from the main memory 64 are respectively supplied to the corresponding cache controllers 54, 56 and are stored both in the corresponding instruction buffers 470, 471 and also in the cache memory 52.

The cache controller 54, 56 supplies to the corresponding address selector portions 420, 421 a completion indicating signal S22 relating to the fact that, as a function of the fetch request signal S20, an instruction has been fetched from the cache memory 52, an instruction has been fetched from the main memory 64 by accessing the memory bus, or the instruction fetch has been terminated.

The information processing device in FIG. 14 comprises a branching prediction portion 430, 431 inside the CPU 40. In accordance with branching prediction bits S30, S32 of instruction codes stored in the instruction buffer, this branching prediction portion 430,431 executes the branching predictions of those fetched branching instructions and supplies the branching prediction information S430, S431 to the appropriate address selector portions 420, 421. The address selector portions 420, 421 add, to the fetch request signals S20, that branching prediction information, a fetch destination address and an information indicating whether branching has been determined, and supply the signals S20 to the cache controller 54,56.

The information processing device shown in FIG. 14 is a dual instruction fetch type and performs both sequential side instruction sequence fetches and target side instruction sequence fetches, and supplies the fetched instructions to the instruction buffers 470,471. Such a dual instruction fetch is performed, in the stage prior to the determination of branching via the branching instruction execution by the instruction execution portion 49, and those prefetched sequential side and target side instruction sequences are stored in instruction buffers 470, 471. Accordingly, whichever direction branching is determined as a result of the branching instruction being executed, the instruction decoding and execution stages after the instruction has been determined can be preformed without confusing the pipeline cycles.

Furthermore, the information processing device shown in FIG. 14 performs branching predictions for the fetched instructions by the branching prediction portions 430, 431 and, in accordance with the results S430, S431, the instruction decoder 49 decodes an instruction from one of the instruction buffers 470, 471. By decoding the instruction in accordance with the branching prediction before a branching instruction has been determined, it is possible to minimize confusion in the pipeline processing cycles at the time when branching is determined.

The cache controller 54, 56 generally fetches an instruction from the cache memory 52 in response to the fetch request, and when a cache hit has occurred, the cache controller stores that fetched instruction in an instruction buffer, and when a cache miss has occurred, the cache controller sends a memory bus access request to the memory bus access portion 60 and fetches an instruction from the main memory 64.

However, while the data bus inside the cache memory unit 50 is a high speed bus, the external memory bus 62 operates at a low frequency and has a narrow bus width. Accordingly, when frequent memory bus accesses are made, the traffic to the memory bus 62 increases, and a memory bus access becomes slower. Accordingly, when the frequency of access to the external memory bus 62 is increased, for example when it has become necessary to fetch from the main memory instructions which have suddenly become necessary, there is the problem that this memory bus access takes time.

As stated later, when branching is not determined, the cache controller 54, 56 according to the present embodiment does not perform a memory bus access after a cache miss has occurred, and terminates instruction fetches, either according to requirements or completely.

In the first control example, in the case of an instruction which is not in the predicted direction, no memory bus access after the cache miss is performed and the instruction fetch is terminated. In the case of an instruction which is not in the predicted direction, since it is highly probable that an instruction fetch of such an instruction will be futile at the time branching has not been determined later, it is probably best not to perform a memory bus access for such an instruction. However, in the case of an instruction which is in the predicted direction, a bus access is made after a cache miss.

In the second control example, if the predicted branching direction is the sequential side and a cache miss has occurred with respect to the target side instruction, that memory bus access is not performed and the memory fetch is terminated. However, if the predicted branching direction is the target side and a cache miss has occurred with respect to the sequential side, even if the instruction is on a different side from the predicted branching direction, the memory bus access is performed and the instruction fetch is completed. The reason for this is that when a cache miss occurs and a memory bus access is made, that instruction and the following address instruction are lumped together and fetched from the cache memory 52 so that the probability of the sequential side instruction sequence making a cache miss is low. Accordingly, even if such low frequency bus access is permitted, there is little possibility of the increase in the traffic on the memory bus 62. In the second control example, a memory bus access after a cache miss is permitted for an instruction which is in the predicted branching direction.

In the third control example, storage in the instruction buffer takes place only if a cache hit has occurred during the period when branching has not yet been determined, and if a cache miss is made a memory bus access is not performed and the instruction fetch is terminated, so that a memory bus access for an instruction for which a cache miss has been made can be preformed after a branching instruction has been determined. In this case, as long as the instruction fetched earlier is stored in the cache memory, the dual instruction fetch technique can be used to prefetch an instruction from either side and store them in the instruction buffer. Then, because a memory bus access is made only for the instruction in the branching direction which is actually being used, after the branching has been determined, it is possible to reduce the frequency of access to the memory bus.

Figure 15:
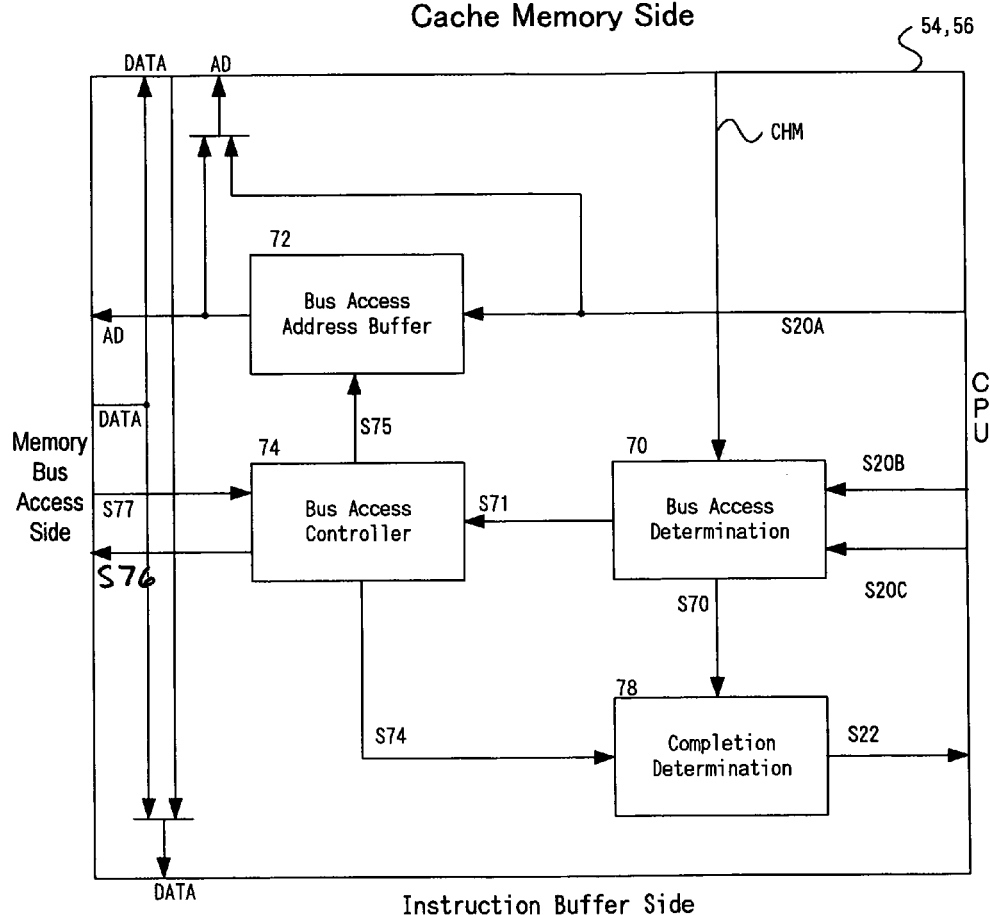
FIG. 15 is a block diagram of a cache controller.

FIG. 15 is a block diagram showing the cache controller. As stated above, the fetch request S20B from the CPU40 is provided together with the fetch address S20A and the branching prediction information S20C. The address S20A is provided to the cache memory 52 and buffered in the bus access address buffering portion 72. In addition, the fetch request signal S20A and the branching prediction information S20C are supplied to the bus access determination portion 70 for assessing whether a bus access is necessary.

The bus access determination portion 70 assesses whether a memory bus access is being requested by reference to the cache hit assessment result due to the cache hit/miss signal CHM from the cache memory 52, the branching prediction information S20C and by reference to whether the present status is a sequential side or target side. In addition, the bus access determination portion 70 supplies that assessment result to the bus access controller 74 as a bus access request signal S71, and supplies a signal S70 indicating that a bus access is not necessary to the completion determination portion 78.

If a memory bus access is assessed as being necessary in the above assessment, the bus access controller 74 transmits, in accordance with the bus access request signal S71 above, a bus access request signal S76 to the memory bus access portion 60, outputs the control signal S75 to the bus access address buffering portion 72 and makes the buffered fetch address output. In addition if a memory bus access is assessed as being unnecessary in the above assessment, the bus access controller 74 does not perform a memory bus access. This assessment is carried out using the algorithm in the control examples 1,2 and 3.

When the data from the main memory 64 is transmitted back in response to a memory bus access, the bus access controller 74 receives the data availability signal S77 from the memory bus access portion 60 and in accordance with this it supplies the bus access completion signal S74 to the completion determination portion 78. The completion determination portion 78 sends to the instruction fetch portion in CPU, in accordance with the bus access completion signal S74 or the signal S70 indicating that a bus access is unnecessary, a completion indicating signal S22 which indicates whether an instruction has been fetched from the cache memory 52, an instruction fetch has been terminated or a fetch has been made from the main memory by a memory bus access.

If a fetch has been made from the main memory, storage in both the cache memory and in the instruction buffer is carried out via the cache controller.

The algorithm which does not perform a memory bus access in the first, second and third control examples will be explained below.

FIG. 16 is a table showing the instruction fetching operations in the first control example of the controller above. Explanation will be given of the operations along the table. In the first controller:

(1) When the branching direction of the branching instruction has not been determined, (1-1) If the branching direction predicted by the branching prediction portion is the target side:

(1) for the sequential side instruction fetch, if an instruction cache miss, a memory bus access is not performed, the instruction fetch is terminated and a memory bus access is not made.

(2) for the target side instruction fetch, if an instruction cache miss, a memory bus access is made and the instruction fetch is completed.

(1-2) If the branching direction predicted for the execution of the branching instruction is the sequential side:

(1) for the target side instruction fetch, if an instruction cache miss, a memory bus access is not performed, the instruction fetch is terminated and a memory bus access is not made.

(2) for the sequential side instruction fetch, if an instruction cache miss, a memory bus access is made and the instruction fetch is completed.

(2) When the branching direction of the branching instruction has been determined, Instruction fetches are made only on the side (sequential side or target side) on which branching has been predicted. In this case, if a cache miss is made, a memory bus access is made and the fetch is completed.

As stated above, in the first control example, in the period when the branching direction has not yet been determined, it is permitted to perform a memory bus access after a cache miss only for an instruction fetch in the predicted branching direction, and in the case of an instruction fetch which is not in the predicted branching direction, a memory bus access after a cache miss is prohibited and bus accesses for instruction fetches which have a high probability of being futile are not performed. When a cache hit is made in either of the above cases, a fetched instruction is stored in the instruction buffer and the instruction fetch is completed.

In addition, the address selector 420, 421 inside the instruction fetch portions 410, 411 reissue an instruction fetch request for an instruction whose instruction fetch have not been completed and whose direction is the branching direction determined by the branching determining signal S10. If a cache miss occurs at this time, a memory bus access is performed and the necessary instruction fetch is performed. At that time, the instruction sequence following this is stored in the cache memory 52.

FIG. 17 is a table showing the instruction fetching operations in the second control example which is an improved version of the first control example. Explanation will be given of the operations along the table. In the second control example:

(1) When the branching direction of the branching instruction has not been determined, (1-1)If the branching direction predicted by the branching prediction portion is the target side;

(1) for sequential side instruction fetch, if an instruction cache miss, a memory bus access is performed, and the instruction fetch is completed.

(2) for a target side instruction fetch, if an instruction cache miss, a memory bus access is made and the instruction fetch is completed.

(1-2)If the branching direction predicted for the execution of the branching instruction is the sequential side;

(1) for target side instruction fetch, if an instruction cache miss, a memory bus access is not performed, the instruction fetch is terminated and a memory bus access is not made.

(2) for the sequential side instruction fetch, if an instruction cache miss, a memory bus access is made and the instruction fetch is completed.

(2) When the branching direction of the branching instruction has been determined, Instruction fetches are made only on the side (sequential side or target side) on which branching has been predicted. In this case, if a cache miss is made, a memory bus access is made and the fetch is completed.

The second control differs from the first control in that if the predicted branching direction is the target side and a cache miss is generated with respect to the sequential side instruction fetch, there is an instruction on the side other than the predicted branching direction but a memory bus access is made and an instruction fetch is completed. Because, the probability of such a case is extremely low, they rarely occur and therefore even if memory bus access is permitted the traffic on the memory access bus is not increased.

FIG. 18 is a table showing the instruction fetching operations in the third control example. Explanation will be given of the operations along the table. In the third control example:

(1) When the branching direction of the branching instruction has not been determined, (1-1) If the branching direction predicted by the branching prediction portion is the target side;

(1) for sequential side instruction fetch, if an instruction cache miss, a memory bus access is not performed, the instruction fetch is terminated, and a memory bus access is not made.

(2) for a target side instruction fetch, if an instruction cache miss, a memory bus access is not made, the instruction fetch is terminated and a memory bus access is not made.

(1-2) If the branching direction predicted for the execution of the branching instruction is the sequential side;

(1) for target side instruction fetch, if an instruction cache miss, a memory bus access is not performed, the instruction fetch is terminated and a memory bus access is not made.

(2) for the sequential side instruction fetch, if an instruction cache miss, a memory bus access is not made, the instruction fetch is terminated and a memory bus access is not made.

(2) When the branching direction of the branching instruction has been determined, Instruction fetches are made only on the side (sequential side or target side) on which branching has been predicted. In this case, even if a cache miss is made, a memory bus access is made, an instruction is fetched from the main memory and the instruction fetch is completed.

In the period when a branching instruction is not executed and branching has not yet been determined, the third control example completely prohibits all memory bus accesses. And it permits memory bus accesses only with respect to instructions for which the branching direction has been determined. If branching has not yet been determined, it is possible that an instruction fetch by a memory bus access will be futile so that such a memory bus access is prohibited and the traffic on the memory bus traffic is reduced. Because instructions for which branching has been determined are stored in advance in the cache memory, there is not such a high probability that a cache miss will actually be generated. Accordingly, simply by making prefetches only from the cache memory and also storing instruction sequences from both the sequential and target sides in the memory buffer, it is possible to execute instructions without very much confusion in the actual pipeline operations.

Finally, a method of reducing memory accesses other than those above will be explained with respect to the fourth control example. FIG. 19 is a diagram showing instruction fetch operations in the fourth control example. In the fourth embodiment of the controller:

(1) When the branching direction of the branching instruction has not been determined, (1-1) If the branching direction predicted by the branching prediction portion is the target side:

(1) if a sequential side instruction fetch makes an instruction cache miss, a memory bus access is not performed, the instruction fetch is terminated, and a memory bus access is not made.

(2) On the other hand, if a target side instruction fetch makes an instruction cache miss, a memory bus access is made and the instruction fetch is completed.

(1-2) If the branching direction predicted for the execution of the branching instruction is the sequential side:

(1) if target side instruction fetch makes an instruction cache miss, a memory bus access is performed and the instruction fetch is completed.

(2) if a sequential side instruction also makes an instruction cache miss, a memory bus access is made and the instruction fetch is completed.

(2) When the branching direction of the branching instruction has been determined, instruction fetches are made only on the side (sequential side or target side) on which branching has been predicted. In this case, an instruction fetch which has performed a memory bus access with a cache miss is completed.

In the case of the fourth control example, if a branching instruction has not yet been determined, and at least the predicted branching direction is the target side and an instruction cache miss is made on the sequential side, a memory bus access is not made. By this means, it is possible to reduce the frequency only of memory bus accesses in such a situation.

In the same way as in the aforementioned fourth control example, even if an optional instruction fetch for a memory bus access is prohibited when branching has not been determined, the frequency of memory bus accesses can be reduced only in that situation. However, at the same time, there are also cases in which it is not possible to make instruction prefetches in the predicted branching direction. It is preferable to give consideration to and achieve a balance between the prohibition of memory buss accesses and the failure of instruction prefetches.

With respect to the four control examples, operations of the second control example which, to a certain degree, achieve a balance between the prohibition of memory bus accesses and the failure of instruction prefetches will be explained with reference to FIG. 1. It is assumed as preconditions that a sequential side instruction fetch is made at Port 0, and that a target side instruction fetch is made at Port 1.

(1) When the branching direction of the branching instruction has not been determined, (1-1) If the branching direction predicted by the branching prediction portion 430, 431 is the target side, in the case of a sequential side instruction fetch, the instruction fetch portion 410 (Port 0) of the CPU40 supplies an instruction fetch request S20 to the cache controller portion 54 (Port 0) inside the cache memory unit 50, and that instruction fetch request is passed on to instruction cache memory 52. A fetch address, information indicating whether branching has been determined yet and branching prediction information and the like are added to this instruction fetch request.

If a cache miss is made in instruction cache memory 52, that signal CHM is returned to the cache controller 54, and cache controller 54 outputs a memory bus access request to memory bus access portion 60. In response to this, the memory bus access portion 60 accesses the memory bus 62, reads an instruction from the main store 64, passes it to the cache controller 54 and writes it to the memory cache 52. The aforementioned memory bus portion (60) also stores the instruction in the instruction buffer (0) 470 inside the CPU 40 and completes the instruction fetch. An instruction fetch completion signal S22 is transmitted back to the instruction fetch portion 410.

Because cache misses in the case of sequential side instruction fetches are not so frequent, even if memory bus accesses are permitted in this case, the overall efficiency of memory bus accesses is not reduced very much.

In case of a target side instruction fetch, an instruction fetch request from the instruction fetch portion 411 inside the CPU 40 is supplied to the cache controller 56 (Port 1) and this instruction fetch request is passed on to the cache memory 52.

If an instruction cache miss is made in the instruction cache memory 52, the cache controller 56 (Port 1) outputs a memory bus access request to the memory bus access portion 60, the memory bus access portion 60 accesses the memory bus 62, reads the instruction from the main store 64, passes it on to the cache controller 56 (Port 1) and writes it to the cache memory 52. The aforementioned memory bus access portion 60 also stores the instruction in the instruction buffer (1) 471 inside the CPU 40 and completes the instruction fetch. Then, an instruction fetch completion signal S22 is transmitted back to the instruction fetch portion 411.

In this case, because an instruction having a predicted branching direction with a high probability of use makes a cache miss, the fact that a memory bus access is permitted, and the prefetch is completed prevents confusion in the pipeline operations after the branching.

(1-2) When the branching direction predicted by the branching prediction portion is the sequential side, in the case of a target side instruction fetch, an instruction fetch request from the instruction fetch portion 411 inside the CPU 40 is sent to the cache controller 56 (Port 1) and this instruction fetch request is passed on to the instruction cache memory.

Even if an instruction cache miss is made in the instruction cache memory 52, the cache controller 56 (Port 1) does not send a memory bus access request to the memory bus access portion 60. As a result, the memory bus access portion 60 does not make a memory bus access. Then, the cache controller 56 terminates the instruction fetch, and transmits back to the address selector portion 421 a signal indicating that the result of the instruction fetch was cancelled.

On the other hand, in the case of a sequential side instruction fetch, an instruction fetch request is sent from the instruction fetch portion 410 (Port 0) inside the CPU40 to the cache controller portion 54 (Port 0), and this instruction fetch request is passed on to instruction cache memory 52.

If a cache miss is made in instruction cache memory 52, cache controller 54 sends a memory bus access request to memory bus access portion 60, and the memory bus access portion 60 accesses the memory bus 62, reads an instruction from the main store 64 and returns it to the cache controller 54. The cache controller 54 writes this instruction to the cache memory 52. The instruction is also stored in the instruction buffer (0) 470 of the CPU40 and the instruction fetch is completed.

(2) When the branching direction has been determined by the execution of a branching instruction, The instruction buffering portion 420 and 421 makes instruction fetches only on the side (sequential side or target side) on which branching has been predicted by the execution of the branching instruction. At this time, if the determined branching direction is the sequential side, the instruction fetch portion 420 requests a bus access to the memory bus access portion 60 via the cache controller (Port 0). The memory bus access portion 60 reads the fetch requested instruction from the main store 64 and stores the instruction in the instruction buffer (0) 470 and the cache memory 52 via the cache controller 54, and completes the instruction fetch If the determined branching direction is the target side, the instruction fetch portion 411 requests a bus access to the memory bus access portion 60 via the cache controller (Port 0). The memory bus access portion 60 reads the fetch requested instruction from the main store 64 and stores the instruction in the instruction buffer (1) 471 via the cache controller 56, and completes the instruction fetch. When the determined branching direction becomes the target side, the target side takes the place of the sequential side, and the sequential side takes the place of the target side.

FIG. 20 is a table showing specific pipeline operations when memory bus accesses have been limited according to the first and second control examples. In this case, pipeline operations are shown, taking as examples the sequential side instruction sequence 01–09 and the target side instruction sequence 51–54 corresponding to branching instruction 03 which are given below the table in FIG. 20. In this case, the predicted branching side for branching instruction 03 does not branch. In other words, the sequential side direction has been predicted.

The pipeline operations are formed by the next stages.

P: an instruction fetch request stage: the CPU makes a fetch request to the cache controller. At this stage, an instruction fetch request is made with an indication of whether it is a prefetch before branching is determined or a fetch after branching has been determined.

T: a fetch stage: a hit/miss assessment is performed in the cache memory and preparations are made to fetch the instruction.

C: an instruction buffer stage: the instruction is input into the instruction buffer.

D: a decoding stage: the instruction decoder decodes the instruction and generates a control signal.

E: an execution stage: the instruction is executed in response to the decoding result control signal.

W: a writing stage: the result indicating that the instruction has been executed is written to a register.

M: cache miss: a cache miss is generated.

B: bus access buffering stage: in order to access the memory bus, an address is buffered in the bus access address buffering portion.

R: bus access request stage: a read request is sent to the memory bus access portion. A bus access is performed and it is assumed that 18 cycles are required until the instruction is read.

To return to FIG. 20 for instruction 01, it is possible to fetch instructions from the cache memory by the instruction fetch request P of cycle 1 and the fetch stage T of cycle 2, and instructions are input into the instruction buffer in cycle 3 (C Stage). Then, instructions are executed in the three cycles 5, 6 and 7 (E stage). After execution, the instruction execution result is written to each type of register (W stage).

Instruction 02 is also stored to the instruction buffer by way of stages P, T and C. Then, at the next cycle 8 after completed the execution stage E of instruction 01, the instruction 02 which has been waiting at the decoding stage D is executed (E stage), and the execution result is written to a register (W stage).

Instruction 03 is assessed as being a branching instruction by the branching prediction portion at the time of instruction buffer stage C, and the branching direction is predicted as being the sequential side. Accordingly, the prefetch of the target side instruction sequence 51, 52 and 53 are started from cycle 6.

As far as instructions 03–07, all the instructions make cache hits without any confusion in the pipeline cycles and the respective execution stages E are executed. Then, it is assumed that instructions 08–10 make cache misses (M stage). In addition, the target side instructions 51–53 also make cache misses (M stage).

In the case of instruction 08, since the branching of branching instruction 03 is not yet determined at the time of cycle 8, a request is made as an instruction prefetch for which branching has not yet been determined (P stage). A cache miss is made in cycle 10. But if, in the first or second controls, a sequential side instruction makes a cache miss at the time when sequential side branching is predicted, that memory bus access is permitted. Accordingly, the system goes to bus access buffering stage B in cycle 11, and goes to the bus access request stage R in cycle 12. Because it is assumed that bus access request stage R will require 18 cycles, the fetched instruction is stored in the instruction buffer and the instruction buffer stage C is entered at cycle 30.

Along with the memory bus access of instruction 08, the following instructions are also fetched from the main memory and stored in the cache memory so that the instruction buffer stage C after instruction 09 occurs following the stage C of instruction 08.

On the other hand, instruction 51 makes a cache miss at the time of cycle 8 but because the predicted branching direction is the sequential side, a memory bus access for the target side instruction 51 is prohibited. In the same way, instructions 52, 53 are also prohibited. Therefore, in cycle 12 in which a memory bus access is made for instruction 08, the memory bus is empty and, therefore, it is possible to make memory bus accesses quickly, then in cycle 32 instruction is executed (E stage).

Furthermore, instructions 11 and 12 go, after branching has been respectively determined, into the instruction fetch stage P so that even if a cache miss is made, the memory bus access is executed. However, in the example in FIG. 7, the instructions 11 and 12 are stored previously in the cache memory at the memory bus access of instruction 08 so that a cache miss does not occur normally.

In the example in FIG. 20, the same operations occur as in the first and second control examples. In other words, even if a cache miss has occurred for a prefetch for an instruction 08 at the time when branching has not yet been determined, a memory bus access is permitted for the instruction 08 with the predicted branching direction.

In the third control example, a memory bus access after a cache miss relating to a prefetch for an instruction 08 at the time when branching has not yet been determined is prohibited. In this case, the instruction is fetched by a memory bus access after a cache miss in response to a repeated instruction fetch from the instruction fetch portion after branching has been determined. The memory bus access in that case is performed at high speed.

FIG. 21 is a table showing specific pipeline operations for the example of conventional, unlimited memory bus access. The pipeline operations shown relate to the same instruction sequences as in FIG. 20.

In this example, instruction 51 is not in the predicted branching direction but a memory bus access is permitted. Accordingly, the system goes into the bus access request stage R from cycle 10. This stage R requires 18 cycles so that even though instruction 08 makes a cache miss (M stage) at cycle 10, the memory bus is in the busy state and this memory bus access R waits until cycle 28. As a result, the execution E stage of instruction 08 is delayed until cycle 48.

In this way, compared with the conventional example, in this embodiment the memory bus access is limited at the stage when branching has not yet been determined so that it is possible to ensure that memory bus accesses are efficiently made for instructions whose use is highly probable, enabling pipeline confusion to be minimized.

In the present invention, access to a main memory is appropriately restricted at the time when there has been a cache miss relating to an instruction fetch when branching has not yet been determined so that it can be made more efficiently that an access to a main memory will be for an instruction in the predicted branching direction and/or for an instruction after branching has been determined.

The present invention is generally implemented as a microprocessor chip. However, it can be implemented as a plurality of chips set, or an information processor system.

The scope of protection of the present invention is not restricted to the embodiments above, but rather protection is claimed to an extent equivalent to the invention as defined in the scope of the patent claims.

What is claimed is:

1. An information processing device which reads, buffers, decodes, and executes instructions from an instruction store portion (11) by pipeline processing, comprising:
   an instruction reading request portion (17) which assigns a read address to said instruction store portion;
   an instruction buffering portion (12) including a plurality of instruction buffers (e-1, e-2) which buffer instruction sequences read from said instruction store portion;
   an instruction execution unit (20) which de and executes instructions buffered by said instruction buffering portion (12);
   a branching instruction detection portion (14) which detects a branching instruction inside the instruction sequences read from said instruction store portion; and
   a branch target address information buffering portion (15) including at least first and second branch target address information buffers (b-1, b-2) which, when said branching instruction detection portion has detected a branching instruction, buffer a branch target address information for generating a branch target address of said branching instruction;
   wherein:
   when said branching instruction detection portion (14) detects a first branching instruction (02) in a first instruction sequence being processed (C1) which is stored in one of said plurality of instruction buffers (e-1), a branch target instruction sequence (C2) of said first branching instruction (02) is stored in the other one of said plurality of instruction buffers (e-2), and said first instruction sequence (C1) and said branch target instruction sequence (C2) are fetched from said instruction store portion (11) and stored in said plurality of instruction buffers (e-1, e-2) sequentially,
   when said branching instruction detection portion (14) detects a next branching instruction (04) following the first branching instruction (02) in said first instruction sequence (C1), a first branch target address information (41) of the next branching instruction (04) is stored in the first branch target address information buffer (b-1) without prefetching a branch target instruction sequence of the next branching instruction,
   when said branching instruction detection portion (14) detects a second branching instruction (12) in said branch target instruction sequence (C2), a second branch target address information (21) of the second branching instruction (12) is stored in the second branch target address information buffer (b-2) without prefetching a branch target instruction sequence of the second branching instruction, and
   when said first branching instruction is executed, depending on the execution result of the first branching instruction, said branch target address information in either the first or second branch target address information buffer (b-1, b-2) is invalidated and another branch target instruction sequence starts to be fetched and stored in said instruction buffer, which is invalidated, based on the branch target address information which is not invalidated.

2. The information processing device as claimed in claim 1 wherein in response to a single instruction read request from said instruction reading request portion, a plurality of consecutive instructions from said read address are read from said instruction store portion and buffered in said instruction buffering portion.

3. An information processing device which reads, buffers, decodes, and executes instructions from an instruction store portion by pipeline processing, comprising:
   an instruction reading request portion which assigns a read address to said instruction store portion;
   an instruction buffering portion including first and second instruction buffers which buffer instruction sequences read from said instruction store portion;
   an instruction execution unit which decodes and executes instructions buffered by said instruction buffering portion;
   a branching instruction detection portion which detects a branching instruction inside the instruction sequences read from said instruction store portion; and
   a branch target address information buffering portion including first and second branch target address information buffers which, when said branching instruction detection portion has detected a branching instruction, buffer a branch target address information for generating a branch target address of said branching instruction;
   wherein:
   a first instruction sequence (C1) being processed is stored in either one of the first or second instruction buffers (e-1) and when said branching instruction detection portion detects a branching instruction (02) inside said first instruction sequence (C1), a second instruction sequence (C2) of the branch target of the branching instruction is stored in the other one of the first or second instruction buffers (e-2) in accordance with the branch target address information of said branching instruction (02);
   the branch target address information (41) of a next branching instruction (04) inside said first instruction sequence (C1) is stored in either one of the first or second branch target address information buffers (b-1) without prefetching a branch target instruction sequence of the next branching instruction (04);

the branch target address information (21) of a branching instruction (12) inside said second instruction sequence (C2) is stored in the other one of said first or second branch target address information buffers (b-2) without prefetching a branch target instruction sequence of the branching instruction (12); and the first or second branch target address information buffer is selected based on an execution result of the branching instruction (02) inside said first instruction sequence (C1).

4. The information processing device as claimed in claim 3 wherein, in a state in which said first instruction sequence being processed (C1) is stored in either one of said first or second instruction buffers (e-1), the second instruction sequence (C2) of the branch target of the branching instruction (02) inside said first instruction sequence is stored in the other one of said fist or second instruction buffers (e-2), the bran target address information (41) of the next branching instruction (04) inside said first instruction sequence (C1) is stored in said first branch target address information buffer (b-1) and the branch target address information (21) of the branching instruction (12) inside said second instruction sequence (C2) is stored in said second branching address information buffer (b-2);

if the execution of the branching instruction (02) inside said first instruction sequence (C1) has resulted in branching, said first instruction sequence (C1) and the branch target address information of the next branching instruction (04) inside said first instruction sequence (C1) are invalidated, a third reaction sequence (C4) of the branch target of the branching instruction (12) inside said second instruction sequence (C2) is stored in one of said first or second instruction buffers (e-1), in accordance with the branch target address information which has been stored in the other one of said first or second branch target address information buffers (b-2), and the branch target address information of the next branching instruction (14) inside said second instruction sequence (C2) is stored in one of the first or second branch target address information buffers (b-1), and the branch target address information of the branching instruction (22) inside said third instruction sequence (C4) is stored in the other one of said first or second branch target address information buffers (b-2).

5. The information processing device as claimed in claim 3 wherein, in a state in which said first instruction sequence being processed is stored in either one of said first or second instruction buffers, the second instruction sequence (C2) of me branch target of the branching instruction (02) inside said first instruction sequence (C1) is stored in the other one of said first or second instruction buffers, the branch target address information of the next branching instruction (04) inside said fir instruction sequence (C1) is stored in said first branch target address information buffer and the branch target address information of the bunching instruction (12) inside said second instruction sequence (C2) is stored in said second branching address information buffer;

if the execution of the branching instruction (02) inside said first instruction sequence (C1) has not resulted in branching, said second instruction sequence (C2) and the branch target address information of the branching instruction (12) inside said second instruction sequence (C2) are invalidated;

a fourth instruction sequence (C3) of the branch target of the next branching instruction (04) inside said first instruction sequence (C1) is stored in one of said first or second instruction buffers, in accordance with the branch target address information which has been stored in the other one of said first or second branch target address information buffers; and a branch target address information of a further next branching instruction inside said first instruction sequence (C1) is stored in one of said first or second branch target address information buffers, and the branching address information of the branching instruction inside said fourth branching instruction sequence (C3) is stored in the other one of said first or second branch target address information buffers.

6. An information processing device which reads, buffers, decodes and executes instructions from an instruction store portion by pipeline processing, comprising:

an instruction reading request portion which assigns a read address to said instruction store portion;

an instruction buffering portion including a plurality of instruction buffers which buffer instruction sequences read from said store portion;

an instruction execution unit which decodes an executes instructions buffered by said instruction buffering portion;

a branching instruction detection portion which detects a branching instruction inside the instruction sequences read from said instruction store portion, and detects branching prediction information of the branching instruction; and a branch target address information buffering portion including a plurality of branch target address information buffers which, when said instruction detection portion has detected a branching instructions buffers branch target address information for generating the branch target address of said branching instruction;

wherein:

when said branching instruction detection portion (14) detects a first branching instruction (02) in a first instruction sequence being processed (C1) which is stored in one of said plurality of instruction buffers (e-1), a branch target instruction sequence (C2) of said first branching instruction (02) is stored in the other one of said plurality of instruction buffers (e-2), and said first instruction sequence (C1) and said branch target instruction sequence (C2) are fetched from said instruction store portion (11) and stored in said plurality of instruction buffers (e-1, e-2) sequentially, when said branching instruction detection portion (14) detects a next branching instruction (04) following the first branching instruction (02) in said first instruction sequence (C1), a first branch target address information (41) of the next branching instruction (04) is stored in the first branch target address information buffer (b-1) without prefetching a branch target instruction sequence of the next branching instruction, when said branching instruction detection portion (14) detects a second branching instruction (12) in said branch target function sequence (C2), a second branch target address information (21) of the second branching instruction (12) is stored in the second branch target address information buffer (b-2) without prefetching a branch target instruction sequence of the second branching instruction, and when said first branching instruction is executed, depending on the execution result of the first branching instruction, said branch target address information in either the first or second branch target address information buffer (b-1, b-2) is invalidated and another branch target instruction sequence starts to be fetched and stored in said instruction buffer, which is invalidated, based on the branch target address information which is not invalidated.

7. The information processing device as claimed in claim 6 wherein, whether said branch target address information buffering portion buffers the branch target address information of a branching instruction is determined in accordance with the branching prediction information of said branching instruction which is detected by said instruction detection portion.

8. The information processing device as claimed in claim 6 wherein when said branch target address information buffering portion has buffered branch target address information of a first branching instruction, if said branching instruction detection portion has detected a second branching instruction which has a greater possibility of branching than said first branching instruction, said branch target address information buffering portion invalidates the branch target address information of said first branching instruction and buffers the branch target address information of said second branching instruction.

9. The information processing device as claimed in claim 6 wherein, when one of said instruction buffers of said instruction buffering portion is empty, if a first branching instruction having a first branching possibility is detected by said branching instruction detection portion, a branch target instruction sequence of said first branching instruction is not fetched to said instruction buffering portion and said branching target address information buffering portion buffers the branch target address information of the first branching instruction, and if said branching instruction detection portion has detected a second branching instruction which has a second branching possibility which is higher than said first branching possibility, a branch target instruction sequence of said second branching instruction is fetched to said instruction buffering portion.

* * * * *